US010775557B2

(12) United States Patent
Chien et al.

(10) Patent No.: US 10,775,557 B2
(45) Date of Patent: Sep. 15, 2020

(54) FIBER COATINGS WITH LOW PULLOUT FORCE

(71) Applicant: CORNING INCORPORATED, Corning, NY (US)

(72) Inventors: Ching-Kee Chien, Horseheads, NY (US); Pushkar Tandon, Painted Post, NY (US); Ruchi Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/673,370

(22) Filed: Nov. 4, 2019

(65) Prior Publication Data

US 2020/0064546 A1 Feb. 27, 2020

Related U.S. Application Data

(63) Continuation-in-part of application No. 16/400,641, filed on May 1, 2019.

(Continued)

(51) Int. Cl.
*G02B 6/02* (2006.01)
*C03B 37/027* (2006.01)
*C03C 13/04* (2006.01)
*C09D 175/08* (2006.01)
*C09D 4/06* (2006.01)
*C03C 25/326* (2018.01)

(52) U.S. Cl.
CPC ........ *G02B 6/02395* (2013.01); *C03B 37/027* (2013.01); *C03B 2203/22* (2013.01);
(Continued)

(58) Field of Classification Search
CPC . G02B 6/02395; C03C 13/04; C03C 2213/00; C09D 175/14
See application file for complete search history.

(56) References Cited

U.S. PATENT DOCUMENTS 4,962,992 A 10/1990 Chapin et al.
5,104,433 A 4/1992 Chapin et al.
(Continued)

FOREIGN PATENT DOCUMENTS

JP 2003329860 A 11/2003

OTHER PUBLICATIONS

International Search Report and Written Opinion of the International Searching Authority; PCT/US2019/03052; dated Jul. 25, 2019; 10 Pages; European Patent Office.

*Primary Examiner* — Daniel Petkovsek
(74) *Attorney, Agent, or Firm* — Kevin L. Bray

(57) ABSTRACT

An optical fiber includes an outer diameter less than 220 μm, a glass fiber that includes a glass core and a glass cladding, a primary coating, and a secondary coating. The glass cladding surrounds and is in direct contact with the glass core. The primary coating surrounds and is in direct contact with the glass fiber. The primary coating can have a Young's modulus less than 0.5 MPa and a thickness less than 30.0 μm. The secondary coating surrounds and is in direct contact with the primary coating. The secondary coating can have a thickness less than 27.5 m. A pullout force of the optical fiber can be less than a predetermined threshold when in an as-drawn state. The pullout force may increase by less than a factor of 2.0 upon aging the primary and secondary coatings on the glass fiber for at least 60 days.

16 Claims, 10 Drawing Sheets

Related U.S. Application Data

(60) Provisional application No. 62/666,376, filed on May 3, 2018.

(52) U.S. Cl.
CPC .......... *C03C 13/046* (2013.01); *C03C 25/326* (2013.01); *C03C 2213/00* (2013.01); *C09D 4/06* (2013.01); *C09D 175/08* (2013.01)

(56) References Cited

U.S. PATENT DOCUMENTS

| | | | |
|---|---|---|---|
| 5,373,578 | A | 12/1994 | Parker et al. |
| 6,215,934 | B1 | 4/2001 | Aloisio et al. |
| 6,563,996 | B1 | 5/2003 | Winningham |
| 9,322,986 | B2 * | 4/2016 | Chien ................ G02B 6/02033 |
| 9,810,838 | B2 | 11/2017 | Chen et al. |
| 2003/0077059 | A1 | 4/2003 | Chien et al. |
| 2003/0123839 | A1 | 7/2003 | Chou et al. |
| 2008/0131062 | A1 * | 6/2008 | Sendai ................ C03C 25/1065 385/100 |
| 2010/0086270 | A1 * | 4/2010 | Oyama ............... C03C 25/1065 385/102 |
| 2015/0071595 | A1 | 3/2015 | Chen et al. |
| 2015/0131956 | A1 | 5/2015 | Iwaguchi et al. |
| 2017/0242209 | A1 | 8/2017 | Tachibana et al. |
| 2018/0127593 | A1 | 5/2018 | Chen et al. |
| 2018/0156996 | A1 | 6/2018 | Iwaguchi et al. |
| 2018/0339941 | A1 | 11/2018 | Suyama et al. |

\* cited by examiner

FIBER COATINGS WITH LOW PULLOUT FORCE

CROSS-REFERENCE TO RELATED APPLICATIONS

This application is a continuation-in-part of, and claims the benefit of priority to, U.S. Provisional Application Ser. No. 62/666,376 filed on May 3, 2018, as well as U.S. patent application Ser. No. 16/400,641 filed on May 1, 2019, entitled FIBER COATINGS WITH LOW PULLOUT FORCE, the content of which are relied upon and incorporated herein by reference in their entirety.

FIELD OF THE DISCLOSURE

This disclosure pertains to fiber coatings with good strippability for splicing. More particularly, this disclosure pertains to primary fiber coatings with low pullout force and strong cohesion.

BACKGROUND OF THE DISCLOSURE

The transmissivity of light through an optical fiber is highly dependent on the properties of the coatings applied to the fiber. The coatings typically include a primary coating and a secondary coating, where the secondary coating surrounds the primary coating and the primary coating contacts the glass fiber (which includes a central glass core surrounded by a glass cladding). The secondary coating is a harder material (higher Young's modulus) than the primary coating and is designed to protect the glass waveguide from damage caused by abrasion or external forces that arise during processing, handling, and installation of the fiber. The primary coating is a softer material (low Young's modulus) and is designed to buffer or dissipates stresses that result from forces applied to the outer surface of the secondary coating. Dissipation of stresses within the primary layer attenuates the stress and minimizes the stress that reaches the glass waveguide. The primary coating is especially important in dissipating stresses that arise when the fiber is bent. The bending stresses transmitted to the glass waveguide on the fiber needs to be minimized because bending stresses create local perturbations in the refractive index profile of the glass waveguide. The local refractive index perturbations lead to intensity losses for the light transmitted through the waveguide. By dissipating stresses, the primary coating minimizes bend-induced intensity losses.

To minimize bending losses, it is desirable to develop primary coating materials with increasingly lower Young's moduli. Coating materials with a Young's modulus below 1 MPa are preferred. As the Young's modulus of the primary coating is reduced, however, cohesion of the primary coating deteriorates and the primary coating is more susceptible to damage in the fiber manufacturing process or during deployment in the field. Operations such as stripping, cabling, and connecting introduce thermal and mechanical stresses to the primary coating that can that lead to the formation of defects in the primary coating. The formation of defects in the primary coating becomes more problematic as the cohesion of the primary coating decreases.

In addition to good cohesion, fiber stripping and splice operations require primary coatings with proper adhesion to the glass fiber. If the adhesion of the primary coating to the glass fiber is too strong, residue from the primary coating remains on the glass fiber and it is difficult to achieve a clean strip. A clean strip is needed to insert the glass fiber into a connector. The opening in fiber connectors is closely matched to the diameter of the glass fiber and the presence of coating residue on the glass fiber prevents insertion of the fiber into a connector. The adhesion requirements are particularly stringent for ribbons, which are linear fiber assemblies that include multiple fibers in a common matrix. When connecting ribbons, all fibers are stripped simultaneously and each fiber must be stripped cleanly without introducing defects in the coating remaining on the unstrapped portion of the glass fiber.

There is a need for a primary coating material that can be cleanly stripped from glass fibers while also having sufficient cohesion to resist formation of defects when the stripping force is applied.

SUMMARY

The present disclosure provides primary coatings formed as cured products of curable compositions. The coatings feature low Young's modulus, low pullout force, low adhesion, and good cohesion. The variation in pullout force over time is low, indicating stable adhesion and consistent performance of the coating over time. The coatings can be used as primary coatings for optical fibers. The primary coatings can be stripped cleanly from glass fiber and are resistant to defect formation when subjected to stripping forces. The primary coatings can be applied to individual fibers or to each of multiple fibers in a ribbon. The curable compositions can also be used to form cured films and other cured products used in applications outside the field of optical fibers.

According to a first aspect of the present disclosure, an optical fiber includes an outer diameter, $OF_{OD}$, of less than 220 μm, a glass core defining a centerline, CL, through a center thereof, a glass cladding surrounding and in direct contact with the glass core, a primary coating surrounding and in direct contact with the glass cladding, and a secondary coating surrounding and in direct contact with the primary coating. The glass core and the glass cladding define a glass fiber. An outer circumference of the glass fiber has a radius from the centerline given by $R_f$ in centimeters. The primary coating has an outer circumference with a radius from the centerline given by $R_p$ in centimeters. The primary coating has a thickness of less than 30 μm and a Young's modulus less than 0.5 MPa. An outer diameter of the secondary coating has a radius from the centerline given by $R_s$ in centimeters. The secondary coating has a thickness less than 27.5 μm. The optical fiber has a pullout force that is less than a critical pullout force ($P_{crit}$) that is given by the equation:

$$P_{crit} = 462 \cdot R_f \left[ \frac{(1+v_p)\ln(R_p/R_f)}{E_p \left( \frac{1}{E_f R_f^2} + \frac{1}{E_s(R_s^2 - R_p^2)} \right)} \right]^{1/2},$$

where $E_f$ is a Young's modulus of the glass fiber in dynes/cm², $E_p$ is the Young's modulus of the primary coating in dynes/cm², and $E_s$ is a Young's modulus of the secondary coating in dynes/cm², and $v_p$ is a Poisson ratio of the primary coating.

In various examples of the first aspect, the Young's modulus of the primary coating can be less than 0.4 MPa or less than 0.3 MPa. In some examples, the pullout force of the optical fiber can be less than 1.05 lb/cm, less than 0.90 lb/cm, or less than 0.65 lb/cm in an as-drawn state. In various examples, the pullout force may increase by less than a factor of 1.8 or less than a factor of 1.6 upon aging the optical fiber for at least 60 days. In some examples, a tear strength of the primary coating can be greater than 30 J/m², greater than 40 J/m², or greater than 50 J/m². In various examples, a tensile toughness of the primary coating can be in the range from 500 kJ/m³-1200 kJ/m³, such as greater than 500 kJ/m³ or greater than 700 kJ/m³. In examples, the outer diameter of the optical fiber can be less than 210 µm, less than 200 µm, or less than 180 µm. In some examples, the thickness of the primary coating can be less than 25 µm or less than 20 µm. In various examples, the secondary coating can have a thickness of less than 25 µm or less than 20 µm. In examples, the primary coating thickness and the secondary coating thickness can each be less than 25 µm or less than 20 µm. In some examples, a ratio of the thickness of the primary coating to the thickness of the secondary coating can be between 0.7 and 1.25. In one specific example, the pullout force can be less than 1.06 lb$_f$/cm when the outer diameter is less than 210 µm. In another specific example, the pullout force can be less than 0.92 lb$_f$/cm when the outer diameter is less than 200 µm. In yet another specific example, the pullout force is less than 0.66 lb$_f$/cm when the outer diameter is less than 180 µm. In various examples, a puncture resistance of the secondary coating can have a normalized puncture load greater than $4.4 \times 10^{-4}$ g/µm². One of skill in the art will recognize that the optical fibers disclosed herein may be incorporated into an optical fiber ribbon that has a plurality of the optical fibers of the present disclosure.

According to a second aspect of the present disclosure, an optical fiber includes an outer diameter, $OF_{OD}$, less than 220 µm, a glass fiber that includes a glass core and a glass cladding, a primary coating, and a secondary coating. The glass cladding surrounds and is in direct contact with the glass core. The primary coating surrounds and is in direct contact with the glass fiber. The primary coating can have a Young's modulus less than 0.5 MPa and a thickness less than 30.0 µm. The secondary coating surrounds and is in direct contact with the primary coating. The secondary coating can have a thickness less than 25.0 µm. A pullout force of the optical fiber can be less than 1.35 lb$_f$/cm when in an as-drawn state. The pullout force may increase by less than a factor of 2.0 upon aging the primary and secondary coatings on the glass fiber for at least 60 days.

In various examples of the second aspect, the Young's modulus of the primary coating can be less than 0.3 MPa. In some examples, a tensile toughness of the primary coating is in the range from 500 kJ/m³-1200 kJ/m³. In examples, a ratio of a thickness of the secondary coating to the thickness of the primary coating is between 0.7 and 1.25. In some specific examples, the pullout force is less than 1.06 lb$_f$/cm when the outer diameter is less than 210 µm. In other specific examples, the pullout force is less than 0.92 lb$_f$/cm when the outer diameter is less than 200 µm. In various specific examples, the pullout force is less than 0.66 lb$_f$/cm when the outer diameter is less than 180 µm. In examples, the pullout force may increase by less than a factor of 1.8 or less than a factor of 1.6 upon aging the optical fiber for at least 60 days. In some examples, a tear strength of the primary coating can be greater than 30 J/m², greater than 40 J/m², or greater than 50 J/m².

According to a third aspect of the present disclosure, a method of designing an optical fiber includes the steps of: (a) selecting a glass fiber, the glass fiber having a modulus E, the glass fiber having a glass core and a glass cladding surrounding and directly contacting the glass core, the glass cladding having a radius $R_f$, (b) selecting the radius $R_f$ for the glass cladding; (c) selecting a primary coating to surround and directly contact the glass cladding, the primary coating having a Young's modulus $E_p$, a Poisson's ratio of $v_p$, and a radius $R_p$; (d) selecting a secondary coating to surround and directly contact the primary coating, the secondary coating having a Young's modulus $E_s$ and a radius $R_s$; and (e) configuring the selection of $E_f$, $R_f$, $E_p$, $R_p$, $E_s$, and $R_s$ such that the optical fiber has a pullout force less than $P_{crit}$, wherein $P_{crit}$ is given by $$P_{crit} = 462 \cdot R_f \left[ \frac{(1+v_p)\ln(R_p/R_f)}{E_p \left( \frac{1}{E_f R_f^2} + \frac{1}{E_s(R_s^2 - R_p^2)} \right)} \right]^{1/2}.$$

In various examples of the third aspect, the pullout force is less than 1.05 lb$_f$/cm, less than 0.90 lb$_f$/cm, or less than 0.65 lb$_f$/cm. In some examples, the step of selecting a primary coating to surround and directly contact the glass cladding may further include selecting a thickness of the primary coating that is in the range of greater than 15 µm to less than 30 µm. In examples, the step of selecting a secondary coating to surround and directly contact the primary coating may further include selecting a thickness of the secondary coating that is in the range of greater than 7.0 µm to less than 25 µm.

According to a fourth aspect of the present disclosure, a method of manufacturing an optical fiber includes the steps of: (a) heating a preform in a furnace, with the preform including a glass core and a glass cladding that surrounds and directly contacts the glass core; (b) drawing the preform to form a glass fiber with a diameter of less than 130 µm, the glass fiber having a modulus $E_f$ and a radius $R_f$; (c) applying a primary coating to surround and directly contact the glass cladding, the primary coating having a Young's modulus, $E_p$, less than 0.5 MPa, a thickness of less than 30 µm, a Poisson's ratio of $v_p$, and a radius $R_p$; and (d) applying a secondary coating to surround and directly contact the primary coating, the secondary coating having a Young's modulus, $E_s$, greater than 1500 MPa, a radius $R_s$, and a thickness less than 25 µm.

In various example of the fourth aspect of the present disclosure, the method of manufacturing an optical fiber can further include the step of testing a pullout force of the optical fiber to ensure the pullout force is less than $P_{crit}$, where $P_{crit}$ is given by:

$$P_{crit} = 462 \cdot R_f \left[ \frac{(1+v_p)\ln(R_p/R_f)}{E_p \left( \frac{1}{E_f R_f^2} + \frac{1}{E_s(R_s^2 - R_p^2)} \right)} \right]^{1/2}.$$

In some examples, the pullout force can be less than 1.05 lb$_f$/cm, less than 0.90 lb$_f$/cm, or less than 0.65 lb$_f$/cm. In examples, the thickness of the primary coating can be in the range of greater than 15 µm to less than 30 µm. In various examples, the thickness of the secondary coating can be in the range of greater than 7.0 µm to less than 25 µm.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
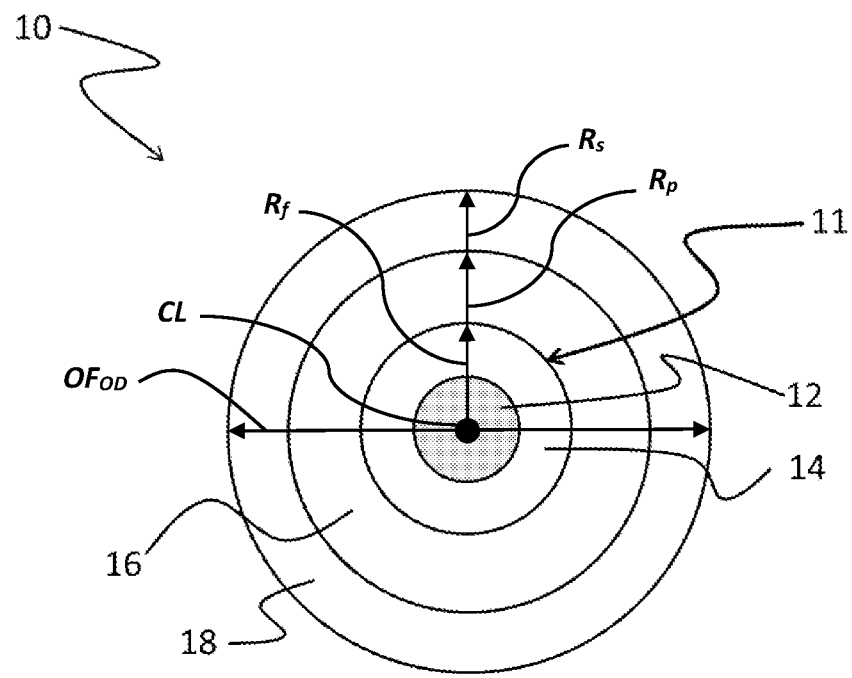
FIG. 1 is a schematic view of a coated optical fiber according one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

In this specification and in the claims that follow, reference will be made to a number of terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction preferably occurs in the presence of a photoinitiator. A radiation-curable component may also be thermally curable. Similarly, a thermally-curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "molecular weight" when applied to polyols means number average molecular weight.

The term "(meth)acrylate" means methacrylate, acrylate, or a combination of methacrylate and acrylate.

Values of Young's modulus, tear strength, tensile toughness and pullout force refer to values as determined under the measurement conditions by the procedures described herein.

The term "pullout force" without further designation (e.g., as-drawn pullout force or aged pullout force) refers to a pullout force of the specified coating in an as-drawn state unless otherwise specified.

Megapascal (MPa) is the customary unit used when referring to Young's modulus. However, in various sections of the present disclosure, such as with reference to Eq. (4), the unit utilized for the Young's modulus is dynes/cm². To convert between MPa and dynes/cm², the conversion factor of 1 MPa=1×10⁷ dynes/cm² should be used.

Reference will now be made in detail to illustrative embodiments of the present description.

The present description relates to curable coating compositions, coatings formed from the curable coating compositions, and coated articles coated or encapsulated by the coating obtained by curing the curable coating compositions. In a preferred embodiment, the curable coating composition is a composition for forming coatings for optical fibers, the coating is an optical fiber coating, and the coated article is a coated optical fiber. The present description also relates to methods of making curable coating compositions, methods of forming coatings from the curable coating compositions, and methods of coating fibers with the curable coating composition. Coatings formed from the curable coating compositions can be stripped cleanly from glass fiber and have strong cohesion.

One embodiment relates to a coated optical fiber. An example of a coated optical fiber is shown in schematic cross-sectional view in FIG. 1. Coated optical fiber 10 includes a glass optical fiber 11 surrounded by primary coating 16 and secondary coating 18. In a preferred embodiment, the primary coating 16 is the cured product of a curable coating composition in accordance with the present description.

The glass fiber 11 is an uncoated optical fiber including a core 12 and a cladding 14, as is familiar to the skilled artisan. Core 12 has a higher refractive index than cladding 14 and glass fiber 11 functions as a waveguide. In many applications, the core and cladding have a discernible core-cladding boundary. Alternatively, the core and cladding can lack a distinct boundary. One such fiber is a step-index fiber. Another such fiber is a graded-index fiber, which has a core whose refractive index varies with distance from the fiber center. A graded-index fiber is formed basically by diffusing the glass core and cladding layer into one another. The cladding can include one or more layers. The one or more cladding layers can include an inner cladding layer that surrounds the core and an outer cladding layer that surrounds the inner cladding layer. The inner cladding layer and outer cladding layer differ in refractive index. For example, the inner cladding layer may have a lower refractive index than the outer cladding layer. A depressed index layer may also be positioned between the inner cladding layer and outer cladding layer.

The optical fiber may also be single or multi-mode at the wavelength of interest, e.g., 1310 or 1550 nm. The optical fiber may be adapted for use as a data transmission fiber (e.g. SMF-28®, LEAF®, and METROCOR®, each of which is available from Corning Incorporated of Corning, N.Y.) Alternatively, the optical fiber may perform an amplification, dispersion compensation, or polarization maintenance function. The skilled artisan will appreciate that the coatings described herein are suitable for use with virtually any optical fiber for which protection from the environment is desired.

The primary coating 16 preferably has a higher refractive index than the cladding of the optical fiber in order to allow it to strip errant optical signals away from the optical fiber core. The primary coating should maintain adequate adhesion to the glass fiber during thermal and hydrolytic aging, yet be strippable from the glass fiber for splicing purposes. The primary coating can have a thickness in the range of 10-30 μm. Primary coatings can be formed by applying a curable coating composition to the glass fiber as a viscous liquid and curing.

Figure 2:
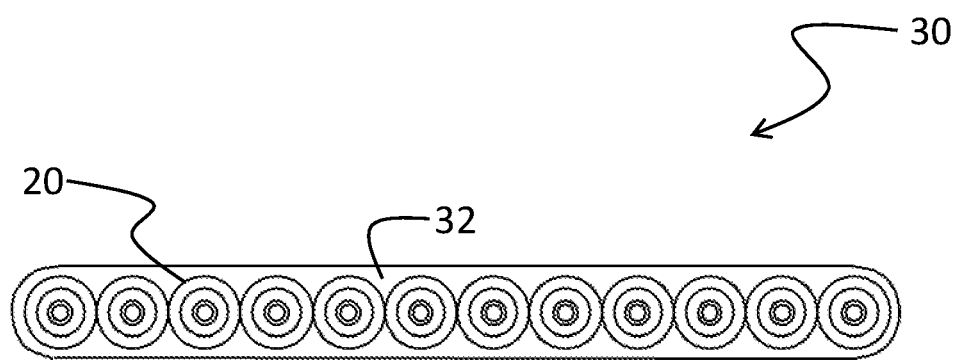
FIG. 2 is a schematic view of a representative optical fiber ribbon. The representative optical fiber ribbon includes twelve coated optical fibers.

FIG. 2 illustrates an optical fiber ribbon 30. The ribbon 30 includes a plurality of optical fibers 20 and a matrix 32 encapsulating the plurality of optical fibers. Optical fibers 20 include a core glass region, a cladding glass region, a primary coating, and a secondary coating as described above. Optical fibers 20 may also include an ink layer. The secondary coating may include a pigment. The optical fibers 20 are aligned relative to one another in a substantially planar and parallel relationship. The optical fibers in fiber optic ribbons are encapsulated by the ribbon matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use. The ribbon matrix 32 can be formed from the same composition used to prepare a secondary coating, or the ribbon matrix 32 can be formed from a different composition that is otherwise compatible for use.

The present disclosure provides a primary coating for optical fibers that exhibits low Young's modulus, low pull-out force, low adhesion, and strong cohesion. The present disclosure provides curable coating compositions that enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces. The low adhesion of the primary coating to the glass fiber further prevents the formation of defects in the primary coating when it is subjected to the stripping forces, thereby offering additional prevention of debris or pieces of the primary coating remaining on the glass fiber following the stripping process.

The primary coating is a cured product of a radiation-curable coating composition that includes an oligomer, a monomer, a photoinitiator and, optionally, an additive. The present disclosure describes oligomers for the radiation-curable coating compositions, radiation-curable coating compositions containing at least one of the oligomers, cured products of the radiation-curable coating compositions that include at least one of the oligomers, optical fibers coated with a radiation-curable coating composition containing at least one of the oligomers, and optical fibers coated with the cured product of a radiation-curable coating composition containing at least one of the oligomers.

The oligomer includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by molecular formula (I):

(I)

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol is represented by molecular formula (II):

(II)

where $R_2$ includes an alkylene group, $-O-R_2-$ is a repeating alkoxylene group, and x is an integer. Preferably, x is greater than 20, or greater than 40, or greater than 50, or greater than 75, or greater than 100, or greater than 125, or greater than 150, or in the range from 20-500, or in the range from 20-300, or in the range from 30-250, or in the range from 40-200, or in the range from 60-180, or in the range from 70-160, or in the range from 80-140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol-20000 g/mol, or in the range from 2000 g/mol-15000 g/mol, or in the range from 2500 g/mol-12500 g/mol, or in the range from 2500 g/mol-10000 g/mol, or in the range from 3000 g/mol-7500 g/mol, or in the range from 3000 g/mol-6000 g/mol, or in the range from 3500 g/mol-5500 g/mol. In some embodiments, the polyol is polydisperse and includes molecules spanning a range of molecular weights such that the totality of molecules combines to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from 0.001 meq/g-0.15 meq/g, or in the range from 0.005 meq/g-0.10 meq/g, or in the range from 0.01 meq/g-0.10 meq/g, or in the range from 0.01 meq/g-0.05 meq/g, or in the range from 0.02 meq/g-0.10 meq/g, or in the range from 0.02 meq/g-0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction to form the oligomer further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane acrylate compound or a combination of two or more polyether urethane acrylate compounds.

The hydroxy acrylate compound is represented by molecular formula (III):

(III)

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate. The hydroxy acrylate compound may include water at residual or higher levels. The presence of water in the hydroxy acrylate compound may facilitate reaction of isocyanate groups to reduce the concentration of unreacted isocyanate groups in the final reaction composition. In various embodiments, the water content of the hydroxy acrylate compound is at least 300 ppm, or at least 600 ppm, or at least 1000 ppm, or at least 1500 ppm, or at least 2000 ppm, or at least 2500 ppm.

In the foregoing exemplary molecular formulas (I), III), and (III), the groups $R_1$, $R_2$, and $R_3$ are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. When p is 2.0, n is in the range from 3.0-5.0, or in the range from 3.0-4.5, or in the range from 3.2-4.8, or in the range from 3.4-4.6, or in the range from 3.6-4.4, and m is in the range from 1.50n-3 to 2.50n-5, or in the range from 1.55n-3 to 2.45n-5, or in the range from 1.60n-3 to 2.40n-5, or in the range from 1.65n-3 to 2.35n-5. For example, when p is 2.0 and n is 3.0, m is in the range from 1.5 to 2.5, or in the range from 1.65 to 2.35, or in the range from 1.80 to 2.20, or in the range from 1.95 to 2.05. For values of p other than 2.0, the molar ratio n:m:p scales proportionally. For example, the molar ratio n:m:p=4.0:3.0:2.0 is equivalent to the molar ratio n:m:p=2.0:1.5:1.0.

The mole number m may be selected to provide an amount of the hydroxy acrylate compound to stoichiometrically react with unreacted isocyanate groups present in the product composition formed from the reaction of diisocyanate compound and polyol used to form the oligomer. The isocyanate groups may be present in unreacted diisocyanate compound (unreacted starting material) or in isocyanate-terminated urethane compounds formed in reactions of the diisocyanate compound with the polyol. Alternatively, the mole number m may be selected to provide an amount of the hydroxy acrylate compound in excess of the amount needed to stoichiometrically react with any unreacted isocyanate groups present in the product composition formed from reaction of the diisocyanate compound and the polyol. The hydroxy acrylate compound is added as a single aliquot or multiple aliquots. In one embodiment, an initial aliquot of hydroxy acrylate is included in the reaction mixture used to form the oligomer and the product composition formed can be tested for the presence of unreacted isocyanate groups (e.g. using FTIR spectroscopy to detect the presence of isocyanate groups). Additional aliquots of hydroxy acrylate compound may be added to the product composition to stoichiometrically react with unreacted isocyanate groups (using, for example, FTIR spectroscopy to monitor a decrease in a characteristic isocyanate frequency (e.g. at 2260 cm$^{-1}$-2270 cm$^{-1}$) as isocyanate groups are converted by the hydroxy acrylate compound). In alternate embodiments, aliquots of hydroxy acrylate compound in excess of the amount needed to stoichiometrically react with unreacted isocyanate groups are added. As described more fully below, for a given value of p, the ratio of the mole number m to the mole number n influences the relative proportions of polyether urethane diacrylate compound and di-adduct compound in the oligomer and differences in the relative proportions of polyether urethane diacrylate compound and di-adduct compound lead to differences in the tear strength and/or critical stress of coatings formed from the oligomer.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol-6500 g/mol, or in the range from 3000 g/mol-6000 g/mol, or in the range from 3500 g/mol-5500 g/mol.

The oligomer includes two components. The first component is a polyether urethane diacrylate compound having the molecular formula (IV):

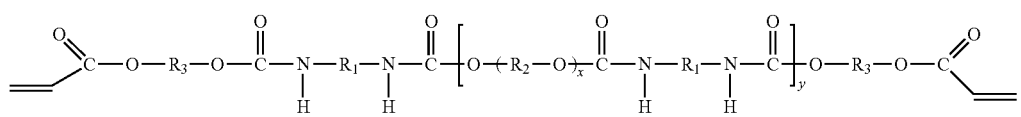

and the second component is a di-adduct compound having the molecular formula (V):

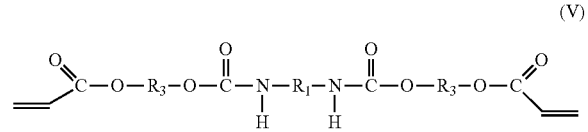

where the groups $R_1$, $R_2$, $R_3$, and the integer x are as described hereinabove, y is a positive integer, and it is understood that the group $R_1$ in molecular formulas (IV) and (V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (III) where the diisocyanate compound has undergone no reaction with the polyol of molecular formula (II).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt %-9.0 wt %, or in the range from 2.5 wt %-6.0 wt %, or in the range from 3.0 wt %-8.0 wt %, or in the range from 3.0 wt % to 5.0 wt %, or in the range from 3.0 wt %-5.5 wt %, or in the range from 3.5 wt %-5.0 wt %, or in the range from 3.5 wt % to 7.0 wt %. It is noted that the concentration of di-adduct is expressed in terms of wt % of the oligomer and not in terms of wt % in the coating composition.

An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~4000 g/mol, which is also referred to herein as PPG4000) to form a polyether urethane diisocyanate compound with formula (VI):

DI~PPG4000~H12MDI~PPG4000~H12MDI (VI)

where "~" denotes a urethane linkage formed by the reaction of a terminal isocyanate group of H12MDI with a terminal alcohol group of PPG4000 and ~H12MDI, ~H12MDI~, and ~PPG4000~ refer to residues of H12MDI and PPG4000 remaining after the reaction. The polyether urethane diisocyanate compound has a repeat unit of the type ~(H12MDI~PPG4000)~. The particular polyether urethane diisocyanate shown includes two PPG4000 units. The reaction may also provide products having one PPG4000 unit, or three or more PPG4000 units. The polyether urethane diisocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane diisocyanate compound forms the polyether urethane acrylate compound with formula (VII):

H12MDI~PPG4000~H12MDI~PPG4000~H12MDI (VII)

and/or the polyether urethane diacrylate compound with formula (VIII):

H12MDI~PPG4000~H12MDI~PPG4000~H12MDI~HEA (VIII)

and reaction of HEA with unreacted H12MDI forms the di-adduct compound with formula (IX):

HEA~H12MDI~HEA (IX)

where, as above, ~ designates a urethane linkage and ~HEA designates the residue of HEA remaining after reaction to form the urethane linkage (consistent with formulas (IV) and (V)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

Although depicted for the illustrative combination of H12MDI, HEA and PPG4000, the foregoing reaction may be generalized to an arbitrary combination of a diisocyanate compound, a hydroxy acrylate compound, and a polyol, where the hydroxy acrylate compound reacts with terminal isocyanate groups to form terminal acrylate groups and where urethane linkages form from reactions of isocyanate groups and alcohol groups of the polyol or hydroxy acrylate compound.

The oligomer includes a compound that is a polyether urethane diacrylate compound with formula (X):

(hydroxy acrylate)~(diisocyanatepolyol)$_x$~diisocyanate~(hydroxy acrylate) (X)

and a compound that is a di-adduct compound with formula (XI):

(hydroxy acrylate)~diisocyanate~(hydroxy acrylate) (XI)

where the relative proportions of diisocyanate compound, hydroxy acrylate compound, and polyol used in the reaction to form the oligomer correspond to the mole numbers n, m, and p disclosed hereinabove.

Compounds represented by molecular formulas (I) and (II) above, for example, react to form a polyether urethane diisocyanate compound represented by molecular formula (XII):

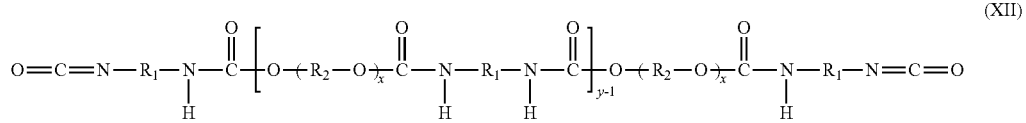

(XII)

where y is the same as y in formula (IV) and is 1, or 2, or 3 or 4 or higher; and x is determined by the number of repeat units of the polyol (as described hereinabove).

Further reaction of the polyether urethane isocyanate of molecular formula (VI) with the hydroxy acrylate of molecular formula (III) provides the polyether urethane diacrylate compound represented by molecular formula (IV) referred to hereinabove and repeated below:

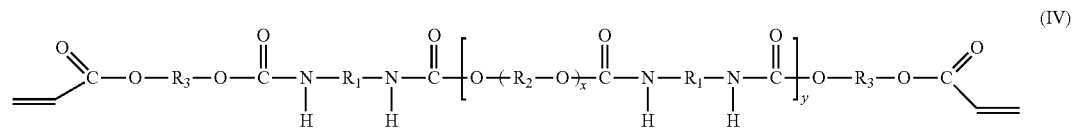

(IV)

where y is 1, or 2, or 3, or 4 or higher; and x is determined by the number of repeat units of the polyol (as described hereinabove).

In an embodiment, the reaction between the diisocyanate compound, hydroxy acrylate compound, and polyol yields a series of polyether urethane diacrylate compounds that differ in y such that the average value of y over the distribution of compounds present in the final reaction mixture is a non-integer. In an embodiment, the average value of y in the polyether urethane diisocyanates and polyether urethane diacrylates of molecular formulas (VI) and (IV) corresponds to p or p−1 (where p is as defined hereinabove). In an embodiment, the average number of occurrences of the group $R_1$ in the polyether urethane diisocyanates and polyether urethane diacrylates of the molecular formulas (XII) and (IV) correspond to n (where n is as defined hereinabove).

The relative proportions of the polyether urethane diacrylate and di-adduct compounds produced in the reaction are controlled by varying the molar ratio of the mole numbers n, m, and p. By way of illustration, the case where p=2.0 is considered. In the theoretical limit of complete reaction, two equivalents p of polyol would react with three equivalents n of a diisocyanate to form a compound having molecular formula (VI) in which y=2. The compound includes two terminal isocyanate groups, which can be quenched with subsequent addition of two equivalents m of a hydroxy acrylate compound in the theoretical limit to form the corresponding polyether urethane diacrylate compound (IV) with y=2. A theoretical molar ratio n:m:p=3.0:2.0:2.0 is defined for this situation.

In the foregoing exemplary theoretical limit, a reaction of diisocyanate, hydroxy acrylate, and polyol in the theoretical molar ratio n:m:p=3.0:2.0:2.0 provides a polyether urethane diacrylate compound having molecular formula (IV) in which y=2 without forming a di-adduct compound. Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n>3.0, such as where n is between 3.0 and 4.5, m is between 1.5n-3 and 2.5n-5, and p is 2.0, for example, produce amounts of the di-adduct compound in the oligomer sufficient to achieve the beneficial coating properties described hereinbelow.

Variations in the relative proportions of di-adduct and polyether urethane diacrylate are obtained through changes in the mole numbers n, m, and p and through such variations, it is possible to precisely control the tear strength, critical stress, tensile toughness, and other mechanical properties of coatings formed from coating compositions that include the oligomer. In one embodiment, control over properties is achievable by varying the number of units of polyol in the polyether urethane diacrylate compound (e.g. p=2.0 vs. p=3.0 vs. p=4.0). In another embodiment, control of tear strength, tensile toughness, and other mechanical properties is achieved by varying the proportions polyether urethane diacrylate compound and di-adduct compound. For a polyether urethane compound with a given number of polyol units, oligomers having variable proportions of di-adduct compound can be prepared. The variability in proportion of di-adduct compound can be finely controlled to provide oligomers based on a polyether urethane diacrylate compound with a fixed number of polyol units that provide coatings that offer precise or targeted values of tear strength, critical stress, tensile toughness, or other mechanical properties.

Improved fiber coatings result when utilizing a coating composition that incorporates an oligomer that includes a polyether urethane acrylate compound represented by molecular formula (IV) and a di-adduct compound represented by molecular formula (V), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt %-10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of di-adduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

In the exemplary stoichiometric ratio n:m:p=3:2:2 described hereinabove, the reaction proceeds with p equivalents of polyol, n=p+1 equivalents of diisocyanate, and two equivalents of hydroxy acrylate. If the mole number n exceeds p+1, the diisocyanate compound is present in excess relative to the amount of polyol compound needed to form the polyether urethane acrylate of molecular formula (IV). The presence of excess diisocyanate shifts the distribution of reaction products toward enhanced formation of the di-adduct compound.

To promote formation of the di-adduct compound from excess diisocyanate compound, the amount of hydroxy acrylate can also be increased. For each equivalent of diisocyanate above the stoichiometric mole number n=p+1, two equivalents of hydroxy acrylate are needed to form the di-adduct compound. In the case of arbitrary mole number p (polyol), the stoichiometric mole numbers n (diisocyanate) and m (hydroxy acrylate) are p+1 and 2, respectively. As the mole number n is increased above the stoichiometric value, the equivalents of hydroxy acrylate needed for complete reaction of excess diisocyanate to form the di-adduct compound may be expressed as m=2+2[n−(p+1)], where the leading term "2" represents the equivalents of hydroxy acrylate needed to terminate the polyether urethane acrylate compound (compound having molecular formula (V)) and the term 2[n−(p+1)] represents the equivalents of hydroxy acrylate needed to convert the excess starting diisocyanate to the di-adduct compound. If the actual value of the mole number m is less than this number of equivalents, the available hydroxy acrylate reacts with isocyanate groups present on the oligomer or free diisocyanate molecules to form terminal acrylate groups. The relative kinetics of the two reaction pathways dictates the relative amounts of polyether urethane diacrylate and di-adduct compounds formed and the deficit in hydroxy acrylate relative to the amount required to quench all unreacted isocyanate groups may be controlled to further influence the relative proportions of polyether urethane diacrylate and di-adduct formed in the reaction.

In some embodiments, the reaction includes heating the reaction composition formed from the diisocyanate compound, hydroxy acrylate compound, and polyol. The heating facilitates conversion of terminal isocyanate groups to terminal acrylate groups through a reaction of the hydroxy acrylate compound with terminal isocyanate groups. In different embodiments, the hydroxy acrylate compound is present in excess in the initial reaction mixture and/or is otherwise available or added in unreacted form to effect conversion of terminal isocyanate groups to terminal acrylate groups. The heating occurs at a temperature above 40° C. for at least 12 hours, or at a temperature above 40° C. for at least 18 hours, or at a temperature above 40° C. for at least 24 hours, or at a temperature above 50° C. for at least 12 hours, or at a temperature above 50° C. for at least 18 hours, or at a temperature above 50° C. for at least 24 hours, or at a temperature above 60° C. for at least 12 hours, or at a temperature above 60° C. for at least 18 hours, or at a temperature above 60° C. for at least 24 hours.

In an embodiment, conversion of terminal isocyanate groups on the polyether urethane diacrylate compound or starting diisocyanate compound (unreacted initial amount or amount present in excess) to terminal acrylate groups is facilitated by the addition of a supplemental amount of hydroxy acrylate compound to the reaction mixture. As indicated hereinabove, the amount of hydroxy acrylate compound needed to quench (neutralize) terminal isocyanate groups may deviate from the theoretical number of equivalents due, for example, to incomplete reaction or a desire to control the relative proportions of polyether urethane diacrylate compound and di-adduct compound. As described hereinabove, once the reaction has proceeded to completion or other endpoint, it is preferable to quench (neutralize) residual isocyanate groups to provide a stabilized reaction product. In an embodiment, supplemental hydroxy acrylate is added to accomplish this objective.

In an embodiment, the amount of supplemental hydroxy acrylate compound is in addition to the amount included in the initial reaction process. The presence of terminal isocyanate groups at any stage of the reaction is monitored, for example, by FTIR spectroscopy (e.g. using a characteristic isocyanate stretching mode near 2265 cm$^{-1}$) and supplemental hydroxy acrylate compound is added as needed until the intensity of the characteristic stretching mode of isocyanate groups is negligible or below a pre-determined threshold. In an embodiment, supplemental hydroxy acrylate compound is added beyond the amount needed to fully convert terminal isocyanate groups to terminal acrylate groups. In different embodiments, supplemental hydroxy acrylate compound is included in the initial reaction mixture (as an amount above the theoretical amount expected from the molar amounts of diisocyanate and polyol), added as the reaction progresses, and/or added after reaction of the diisocyanate and polyol compounds has occurred to completion or pre-determined extent.

Amounts of hydroxy acrylate compound above the amount needed to fully convert isocyanate groups are referred to herein as excess amounts of hydroxy acrylate compound. When added, the excess amount of hydroxy acrylate compound is at least 20% of the amount of supplemental hydroxy acrylate compound needed to fully convert terminal isocyanate groups to terminal acrylate groups, or at least 40% of the amount of supplemental hydroxy acrylate compound needed to fully convert terminal isocyanate groups to terminal acrylate groups, or at least 60% of the amount of supplemental hydroxy acrylate compound needed to fully convert terminal isocyanate groups to terminal acrylate groups, or at least 90% of the amount of supplemental hydroxy acrylate compound needed to fully convert terminal isocyanate groups to terminal acrylate groups.

In an embodiment, the amount of supplemental hydroxy acrylate compound may be sufficient to completely or nearly completely quench residual isocyanate groups present in the oligomer formed in the reaction. Quenching of isocyanate groups is desirable because isocyanate groups are relatively unstable and often undergo reaction over time. Such reaction alters the characteristics of the reaction composition or oligomer and may lead to inconsistencies in coatings formed therefrom. Reaction compositions and products formed from the starting diisocyanate and polyol compounds that are free of residual isocyanate groups are expected to have greater stability and predictability of characteristics.

The oligomer of the coating composition includes a polyether urethane diacrylate compound and di-adduct compound as described hereinabove. In some aspects, the oligomer includes two or more polyether urethane diacrylate compounds and/or two or more di-adduct compounds. The oligomer content of the coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt %-80 wt %, or in the range from 30 wt %-70 wt %, or in the range from 40 wt %-60 wt %, where the concentration of di-adduct compound within the oligomer content is as described above.

The curable coating composition further includes one or more monomers. The one or more monomers is/are selected to be compatible with the oligomer, to control the viscosity of the coating composition to facilitate processing, and/or to influence the physical or chemical properties of the coating formed as the cured product of the coating composition. The monomers include ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—, or —O—CH(CH$_3$)—CH$_2$—), etc. As used herein, the degree of alkoxylation refers to the number of alkoxylene groups in the monomer. In one embodiment, the alkoxylene groups are bonded consecutively in the monomer.

In some aspects, the coating composition includes an alkoxylated monomer of the form $R_4$-$R_5$—O—(CH(CH$_3$)CH$_2$—O)$_q$—C(O)CH=CH$_2$, where $R_4$ and $R_5$ are aliphatic, aromatic, or a mixture of both, and q=1 to 10, or $R_4$—O—(CH(CH$_3$)CH$_2$—O)$_q$—C(O)CH=CH$_2$, where C(O) is a carbonyl group, $R_1$ is aliphatic or aromatic, and q=1 to 10.

Representative examples of monomers include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some aspects, the coating composition includes an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt %-15.0 wt %, or in the range from 2.0 wt %-10.0 wt %, or in the range from 3.0 wt %-8.0 wt %.

In an embodiment, the coating composition includes one or more monofunctional acrylate or methacrylate monomers in an amount from 5-95 wt %, or from 30-75 wt %, or from 40-65 wt %. In another embodiment, the coating composition may include one or more monofunctional aliphatic epoxy acrylate or methacrylate monomers in an amount from 5-40 wt %, or from 10-30 wt %.

In an embodiment, the monomer component of the coating composition includes a hydroxyfunctional monomer. A hydroxyfunctional monomer is a monomer that has a pendant hydroxy moiety in addition to other reactive functionality such as (meth)acrylate. Examples of hydroxyfunctional monomers including pendant hydroxyl groups include caprolactone acrylate (available from Dow Chemical as TONE M-100); poly(alkylene glycol) mono(meth)acrylates, such as poly(ethylene glycol) monoacrylate, poly(propylene glycol) monoacrylate, and poly(tetramethylene glycol) monoacrylate (each available from Monomer, Polymer & Dajac Labs); 2-hydroxyethyl (meth)acrylate, 3-hydroxypropyl (meth)acrylate, and 4-hydroxybutyl (meth)acrylate (each available from Aldrich).

In an embodiment, the hydroxyfunctional monomer is present in an amount sufficient to improve adhesion of the coating to the optical fiber. The hydroxyfunctional monomer is present in the coating composition in an amount between about 0.1 wt % and about 25 wt %, or in an amount between about 5 wt % and about 8 wt %. The use of the hydroxyfunctional monomer may decrease the amount of adhesion promoter necessary for adequate adhesion of the primary coating to the optical fiber. The use of the hydroxyfunctional monomer may also tend to increase the hydrophilicity of the coating. Hydroxyfunctional monomers are described in more detail in U.S. Pat. No. 6,563,996, the disclosure of which is hereby incorporated by reference in its entirety.

In different embodiments, the total monomer content of the coating composition is between about 5 wt % and about 95 wt %, or between about 30 wt % and about 75 wt %, or between about 40 wt % and about 65 wt %.

In some embodiments, the coating composition may also include one or more polymerization initiators and one or more additives.

The polymerization initiator facilitates initiation of the polymerization process associated with the curing of the coating composition to form the coating. Polymerization initiators include thermal initiators, chemical initiators, electron beam initiators, and photoinitiators. Photoinitiators are preferred polymerization initiators. Photoinitiators include ketonic photoinitiating additives and/or phosphine oxide additives. When used in the formation reaction of the coating of the present disclosure, the photoinitiator is present in an amount sufficient to enable rapid radiation curing. The wavelength of curing radiation is infrared, visible, or ultraviolet. Representative wavelengths include wavelengths in the range from 300 nm-1000 nm, or in the range from 300 nm-700 nm, or in the range from 300 nm-400 nm, or in the range from 325 nm-450 nm, or in the range from 325 nm-400 nm, or in the range from 350 nm-400 nm. Curing can be accomplished with a lamp source (e.g. Hg lamp) or LED source (e.g. a UVLED, visible LED, or infrared LED).

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The coating composition includes a single photoinitiator or a combination of two or more photoinitiators. The total photoinitiator concentration in the coating composition is greater than 0.25 wt %, or greater than 0.50 wt %, or greater than 0.75 wt %, or greater than 1.0 wt %, or in the range from 0.25 wt %-5.0 wt %, or in the range from 0.50 wt %-4.0 wt %, or in the range from 0.75 wt %-3.0 wt %.

In addition to monomer(s), oligomer(s), and polymerization initiator(s), the coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the coating composition (e.g., protect against de-polymerization or oxidative degradation).

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis(trialkoxysilylethyl)hexane, allyltrialkoxysilane, styrylethyltrialkoxysilane, and bis(trimethoxysilylethyl)benzene (available from United Chemical Technologies (Bristol, Pa.)); see U.S. Pat. No. 6,316,516, the disclosure of which is hereby incorporated by reference in its entirety herein.

The adhesion promoter is present in the coating composition in an amount between 0.02 wt % and 10.0 wt %, or between 0.05 wt % and 4.0 wt %, or between 0.1 wt % and 4.0 wt %, or between 0.1 wt % and 3.0 wt %, or between 0.1 wt % and 2.0 wt %, or between 0.1 wt % and 1.0 wt %, or between 0.5 wt % and 4.0 wt %, or between 0.5 wt % and 3.0 wt %, or between 0.5 wt % and 2.0 wt %, or between 0.5 wt % to 1.0 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 wt %, or greater than 0.50 wt %, or greater than 0.75 wt %, or greater than 1.0 wt %, or an amount in the range from 0.25 wt %-3.0 wt %, or an amount in the range from 0.50 wt %-2.0 wt %, or an amount in the range from 0.75 wt %-1.5 wt %.

Representative optical brighteners include TINOPAL OB (available from BASF); Blankophor KLA (available from Bayer); bisbenzoxazole compounds; phenylcoumarin compounds; and bis(styryl)biphenyl compounds. In an embodiment, the optical brightener is present in the coating composition at a concentration of 0.005 wt %-0.3 wt %.

Representative amine synergists include triethanolamine; 1,4-diazabicyclo[2.2.2]octane (DABCO), triethylamine, and methyldiethanolamine. In an embodiment, an amine synergist is present at a concentration of 0.02 wt %-0.5 wt %.

Curing of the coating composition provides a cured product, such as a primary coating, with increased resistance to defect formation during manufacturing or subsequent processing, including splicing.

As described in greater detail hereinbelow, the present disclosure demonstrates that primary coatings having low pullout force and strong cohesion can be stripped cleanly from glass fibers while maintaining resistance to defect formation during splicing. The primary coatings of the present disclosure combine a low Young's modulus with strong cohesion and low adhesion to enable splicing of fibers and ribbons with minimal coating residue on the spliced portion of the optical fiber and few defects in the coating remaining on the unspliced portion of the optical fiber.

In a continuous optical fiber manufacturing process, a glass fiber is drawn from a heated preform and sized to a target diameter (e.g., 125 μm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. In some processes, the coating system further applies a tertiary coating to the secondary coating. Typically, the tertiary coating is an ink layer used to mark the fiber for identification purposes. After the fiber exits the coating system, the fiber is collected and stored at room temperature. Collection of the fiber typically entails winding the fiber on a spool and storing the spool.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

In the course of the present disclosure, it has been observed that pullout force is a reliable indicator of the adhesion of a primary coating to a glass fiber. Adhesion of the primary coating to a glass fiber needs to be strong enough to prevent separation of the primary coating from the glass fiber during routine handling, but not so strong that it is difficult to remove the primary coating during the stripping and splicing operations.

The primary coatings disclosed herein exhibit a pullout force consistent with the level of adhesion needed for adherence to a glass fiber while permitting removal without residue during stripping. In the course of the present disclosure, however, it has been observed that the pullout force of primary coatings evolves over time. In particular, the pullout force increases from an initial value at the time of draw to higher values at later times. Time evolution of pullout force is undesirable. As pullout force increases over time, adhesion of the primary coating to the glass fiber becomes stronger and it becomes more difficult to remove the primary coating during splicing without leaving residue on the stripped portion of the fiber.

The pullout force of the primary coatings disclosed herein exhibits improved stability over time relative to prior art primary coatings. For purposes of the present disclosure, stability over time is measured beginning from the time the fiber is stored after coating in the manufacturing process used to make the fiber from a preform. The state of the optical fiber at the initial time of storage in the original manufacturing process is referred herein as the "as-drawn state" of the optical fiber. In the as-drawn state, the fiber is coated and at room temperature on a storage device (e.g. spool) positioned along a continuous process pathway extending from the preform through a coating system to the storage device. The time of placement of the fiber in the as-drawn state is the time at which the fiber is collected at the storage device. Measurements of the properties of the fiber in the as-drawn state are made as soon as practicable following time of collection at the storage device. In instances in which a measurement delay occurs, the properties of the fiber in the as-drawn state can be determined from data obtained at later times through back extrapolation of a fit obtained from Eq. (3) given below.

Cohesion refers to tear strength and/or tensile toughness. Tensile toughness is a measure of the force needed to initiate a break in a coating and tear strength is a measure of the force required to expand a break in a coating once it has been initiated.

The present disclosure extends to optical fibers coated with the cured product of the coating compositions. The optical fiber includes a glass waveguide with a higher index glass core region surrounded by a lower index glass cladding region. A coating formed as a cured product of the present coating compositions surrounds and is in direct contact with the glass cladding. The cured product of the present coating compositions preferably functions as the primary coating of the fiber. The fiber may include a secondary coating or both a secondary and tertiary coating.

Figure 9:
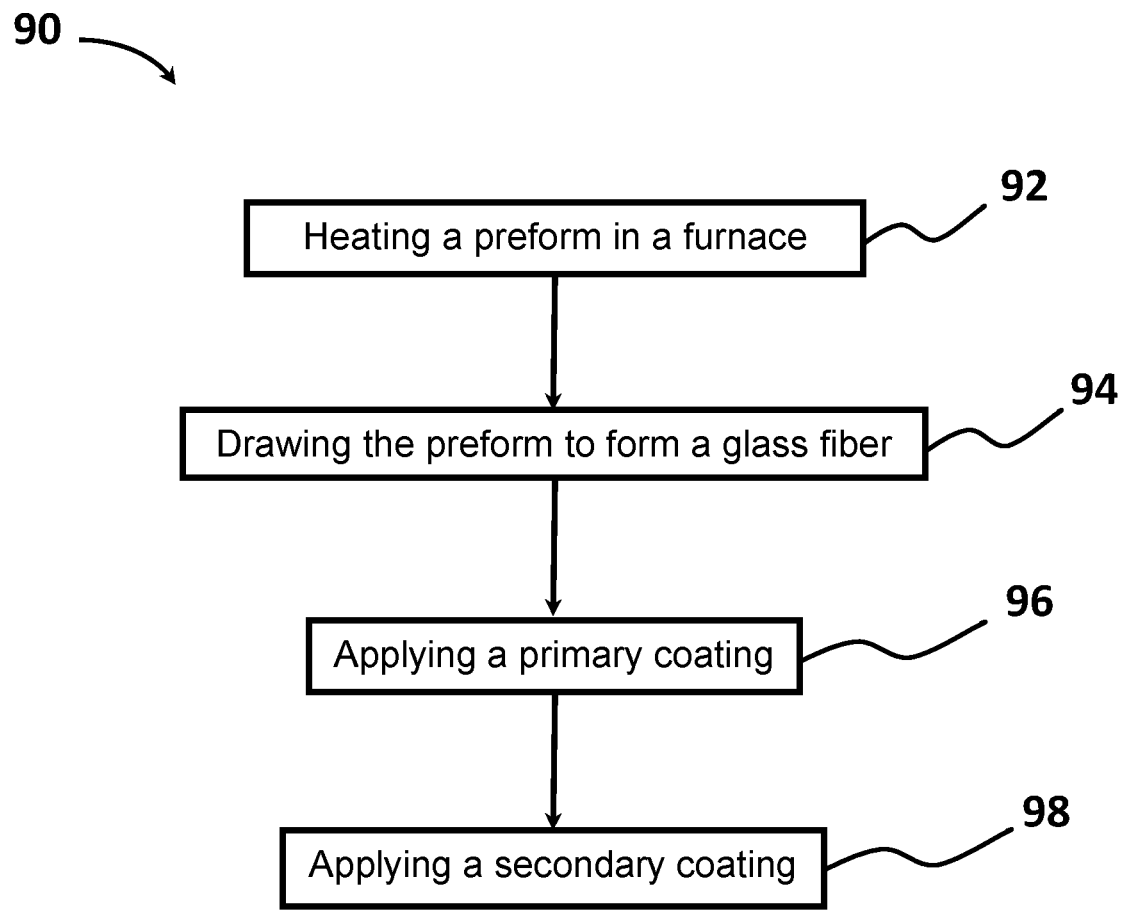
FIG. 9 shows a flow diagram of a method of manufacturing an optical fiber, according to one example.

With reference to FIG. 9, a method 90 of manufacturing an optical fiber 10 can include step 92 of heating a preform in a furnace, with the preform including a glass core 12 and a glass cladding 14 that surrounds and directly contacts the glass core 12. The method 90 of manufacturing an optical fiber 10 can also include step 94 of drawing the preform to form a glass fiber 11. The glass fiber 11 resulting from step 94 can have a target diameter (e.g., less than 130 µm), a Young's modulus, $E_f$, and a radius, $R_f$. The method 90 of manufacturing an optical fiber 10 can further include step 96 of applying a primary coating 16 to surround and directly contact the glass cladding 14. In some examples, the primary coating 16 includes a Young's modulus, $E_p$, of less than 0.5 MPa, a thickness of less than 30 µm, a Poisson ratio, $v_p$, and a radius, $R_p$. The method 90 of manufacturing an optical fiber 10 can also include step 98 of applying a secondary coating 18 to surround and directly contact the primary coating 16. In various examples, the secondary coating 18 includes a Young' modulus, $E_s$, greater than 1500 MPa, a radius, $R_s$, and a thickness of less than 25 µm. The method 90 of manufacturing an optical fiber 10 can further include the step of testing a pullout force of the optical fiber 10 to ensure the pullout force is less than a critical pullout force, $P_{crit}$. The calculation of the critical pullout force will be discussed in further detail below with reference to Eq. (4).

Figure 10:
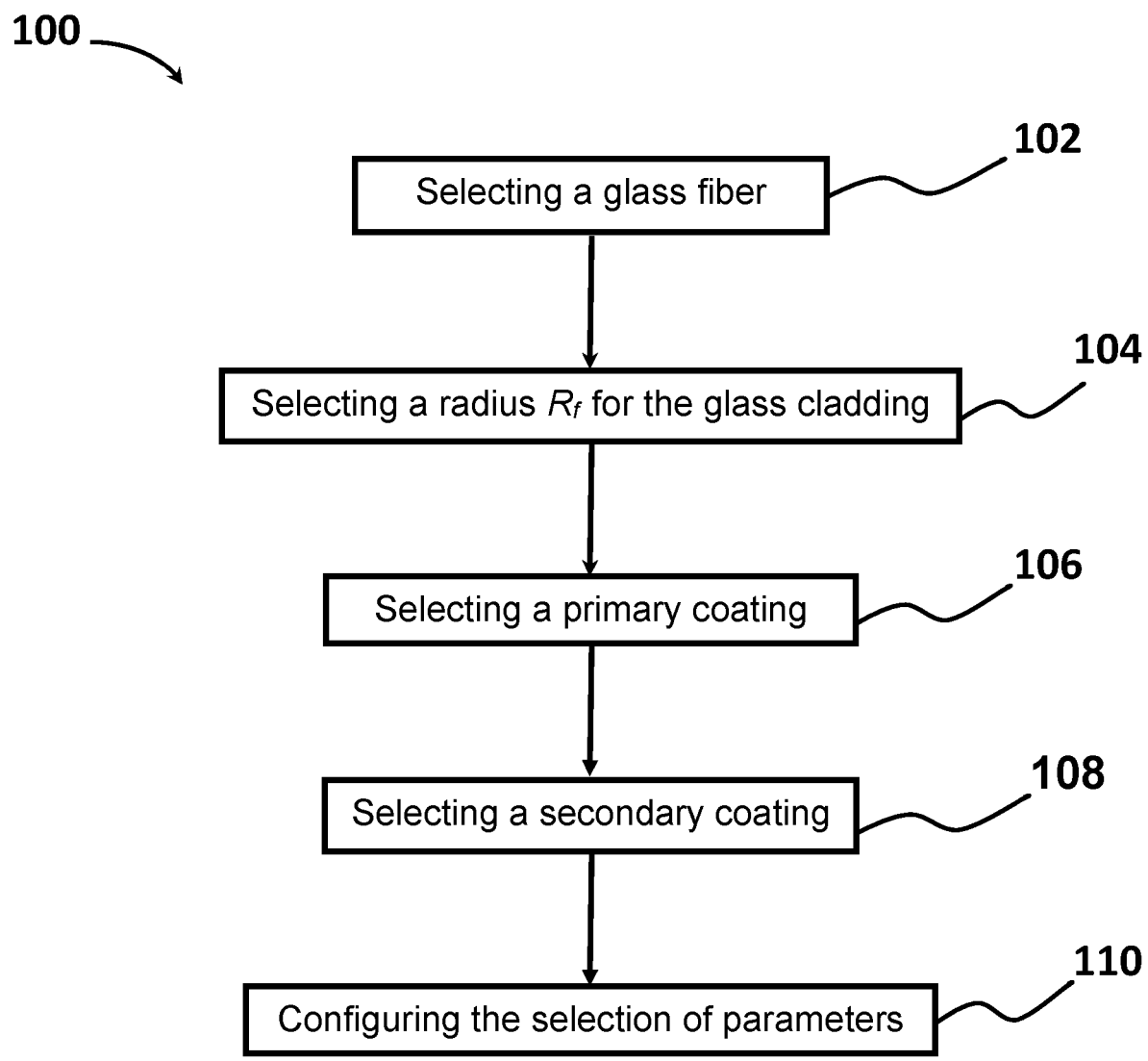
FIG. 10 shows a flow diagram of a method of designing an optical fiber, according to one example.

With reference to FIG. 10, a method 100 of designing an optical fiber 10 can include step 102 of selecting a glass fiber 11. The selection of a glass fiber 11 in step 102 may take into account various characteristics or parameters of the glass fiber 11. For example, the selection of a glass fiber 11 may take into account the Young's modulus, $E_f$, of the glass fiber 11, a diameter of the glass core 12, a composition of the glass core 12, a diameter of the cladding 14, a composition of the cladding 14, and/or a number of layers of the cladding 14. The method 100 of designing an optical fiber 10 can also include step 104 of selecting a radius, $R_f$, for the glass cladding 14. The method 100 of designing an optical fiber 10 can further include step 106 of selecting a primary coating 16 to surround and directly contact the glass cladding 14. The primary coating 16 can be selected, in various examples, based on at least one of the Young's modulus, $E_p$, of the primary coating 16, the Poisson ratio, $v_p$, of the primary coating 16, and/or the radius, $R_p$, of the primary coating 16. The method 100 of designing an optical fiber 10 can also include step 108 of selecting a secondary coating 18 to surround and directly contact the primary coating 16. The secondary coating 18 can be selected, in various examples, based on at least one of the Young's modulus, $E_s$, of the secondary coating 18 and/or the radius, $R_s$, of the secondary coating 18. The method 100 of designing an optical fiber 10 can further include step 110 of configuring the selection of the various parameters (e.g., $E_f$, $R_f$, $E_p$, $R_p$, $E_s$, and/or $R_s$) such that the optical fiber 10 has a pullout force less than a critical pullout force, $P_{crit}$. The calculation of the critical pullout force will be discussed in further detail below with reference to Eq. (4).

EXAMPLES

Several illustrative coatings prepared from coating compositions that included an oligomer in accordance with the present disclosure were prepared and tested. The tests included measurements of pullout force, tear strength, and tensile toughness. The pullout force for various thicknesses of the primary coating and the secondary coating were also tested. The preparation of oligomers, description of the components of the coating compositions, processing conditions used to form oligomers and coatings, test methodologies, and test results are described hereinbelow.

Coating Compositions.

The components of primary coating compositions and the concentrations of each component are summarized in Table 1. The coating compositions A and B listed in Table 1 are in accordance with the present disclosure. Coating composition C is a comparative composition. Additional commercial coating compositions designated as D, E, F, and G were tested for comparative purposes. The commercial compositions were obtained from DSM Desotech (Elgin, Ill.) and included conventional oligomers. The specific formulations are proprietary to the vendor. Composition D had product code 950-076, Composition E had product code 950-030, Composition G had product code 3741-143, and Composition F was a variant of Composition G that included an adhesion promoter. The oligomers present in comparative coating compositions C-G contained a lower concentration of di-adduct compound than coating compositions A and B.

TABLE 1

Coating Formulations

| Component | Formulation | | |
|---|---|---|---|
| | A | B | C |
| Oligomer 1 (wt %) | 49.10 | | |
| Oligomer 2 (wt %) | | 49.10 | |
| Oligomer 3 (wt %) | | | 50.0 |
| SR504 (wt %) | 45.66 | 45.66 | 46.5 |
| NVC (wt %) | 1.96 | 1.96 | 2.0 |
| TPO (wt %) | 1.47 | 1.47 | 1.5 |
| Irganox 1035 (wt %) | 0.98 | 0.98 | 1.0 |
| 3-mercaptopropyltrimethoxysilane (wt %) | 0.79 | | |

TABLE 1-continued

Coating Formulations

| Component | Formulation | | |
|---|---|---|---|
| | A | B | C |
| 3-acryloxypropyltrimethoxysilane (wt %) | | 0.79 | 0.8 |
| Tetrathiol (wt %) | 0.03 | 0.03 | 0.03 |

Oligomer 1 and Oligomer 2 are products of reactions of H12MDI (4,4'-methylene bis(cyclohexyl isocyanate), PPG4000 (polypropylene glycol with $M_n$~4000 g/mol) and HEA (2-hydroxyethyl acrylate). The reaction conditions are described below. SR504 is ethoxylated(4)nonylphenol acrylate (available from Sartomer). NVC is N-vinylcaprolactam (available from ISP Technologies). TPO is (2,4,6-trimethylbenzoyl)diphenyl phosphine oxide (available from BASF under the trade name Lucirin) and functions as a photoinitiator. Irganox 1035 is thiodiethylene bis[3-(3,5-di-tert-butyl)-4-hydroxy-phenyl) propionate] (available from BASF under the trade name Irganox 1035) and functions as an antioxidant. 3-acryloxypropyl trimethoxysilane (available from Gelest) and 3-mercaptopropyl trimethoxysilane (available from Aldrich) are adhesion promoters. Tetrathiol is pentaerythritoltetrakis(3-mercaptopropionate) (available from Aldrich) and functions as a quencher of residual dibutyltin dilaurate catalyst that may be present in Oligomer 1 and Oligomer 2.

Oligomer 1 and Oligomer 2.

Coating compositions A and B are curable coating compositions that included an oligomer of the type disclosed herein. For purposes of illustration, preparation of exemplary oligomers from H12MDI (4,4'-methylene bis(cyclohexyl isocyanate), PPG4000 (polypropylene glycol with $M_n$~4000 g/mol) and HEA (2-hydroxyethyl acrylate) in accordance with the reaction scheme disclosed hereinabove is described. All reagents were used as supplied by the manufacturer and were not subjected to further purification. H12MDI was obtained from ALDRICH. PPG4000 was obtained from COVESTRO and was certified to have an unsaturation of 0.004 meq/g as determined by the method described in the standard ASTM D4671-16. HEA was obtained from KOWA.

The relative amounts of the reactants and reaction conditions were varied to obtain Oligomer 1 and Oligomer 2. Oligomer 1 and Oligomer 2 were prepared with different initial molar ratios of reactants with the molar ratios of the reactants satisfying the ratio H12MDI:HEA:PPG4000=n:m:p, where n was in the range from 3.0 to 4.0, m was in the range from 1.5n-3 to 2.5n-5, and p=2. In the reactions used to form Oligomer 1 and Oligomer 2, dibutyltin dilaurate was used as a catalyst (at a level of 160 ppm based on the mass of the initial reaction mixture) and 2,6-di-tert-butyl-4-methylphenol (BHT) was used as an inhibitor (at a level of 400 ppm based on the mass of the initial reaction mixture).

The amounts of the reactants used to prepare Oligomer 1 and Oligomer 2 are summarized in Table 2 below. Corresponding sample numbers will be used herein to refer to coating compositions and cured films formed from coating compositions that individually contain each of the six oligomers. The corresponding mole numbers used in the preparation of each of the six samples are listed in Table 3 below. The mole numbers are normalized to set the mole number p of PPG4000 to 2.0.

TABLE 2

Reactants and Amounts for Oligomers

| Oligomer | H12MDI (g) | HEA (g) | PPG4000 (g) |
|---|---|---|---|
| 1 | 26.1 | 10.6 | 213.3 |
| 2 | 26.1 | 10.6 | 213.3 |

TABLE 3

Mole Numbers and Di-adduct Content for Oligomers

| Sample | H12MDI Mole Number (n) | HEA Mole Number (m) | PPG4000 Mole Number (p) | Di-adduct (wt %) |
|---|---|---|---|---|
| 1 | 3.7 | 3.4 | 2.0 | 3.7 |
| 2 | 3.7 | 3.4 | 2.0 | 3.7 |

Oligomer 1 and Oligomer 2 were prepared by mixing 4,4'-methylene bis(cyclohexyl isocyanate), dibutyltin dilaurate and 2,6-di-tert-butyl-4 methylphenol at room temperature in a 500 mL flask. The 500 mL flask was equipped with a thermometer, a $CaCl_2$ drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C.-75° C. for about 1-1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 cm$^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C.-75° C. for about 1-1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement. The HEA amounts listed in Table 1 include the initial amount of HEA in the composition and any amount of supplemental HEA needed to quench unreacted isocyanate groups.

The concentration (wt %) of di-adduct compound was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 μm, specified molecular weight range=200-400,000 g/mol). The third column (column 3) was sold under Part No. PL1110-6520 by Agilent Technologies and was packed with PLgel 100A stationary phase (polystyrene divinyl benzene copolymer, average particle size=5 µm, specified molecular weight range=up to 4,000 g/mol). The columns were calibrated with polystyrene standards ranging from 162-6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 µL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in Oligomer 1 and Oligomer 2 was quantified using the preceding GPC system and technique. A calibration curve was obtained using standard solutions containing known amounts of the di-adduct compound (HEA~H12MDI-HEA) in THF. Standard solutions with di-adduct concentrations of 115.2 µg/g, 462.6 µg/g, 825.1 µg/g, and 4180 µg/g were prepared. (As used herein, the dimension "µg/g" refers to µg of di-adduct per gram of total solution (di-adduct+THF)). Two 100 µL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in Oligomer 1 and Oligomer 2 was determined using the calibration. Samples were prepared by diluting ~0.10 g of each oligomer in THF to obtain a ~1.5 g test solution. The test solution was run through the GPC instrument and the area of the peak associated with the di-adduct compound was determined. The di-adduct concentration in units of µg/g was obtained from the peak area and the calibration curve, and was converted to wt % by multiplying by the weight (g) of the test solution and dividing by the weight of the sample of oligomer before dilution with THF. The wt % of di-adduct compound present in Oligomer 1 and Oligomer 2 are reported in Table 3. The entries in Table 1 for Oligomer 1 and Oligomer 2 include the combined amount of polyether urethane acrylate compound and di-adduct compound.

Through variation in the relative mole ratios of H12MDI, HEA, and PPG4000, the illustrative oligomers include a polyether urethane compound of the type shown in molecular formula (IV) hereinabove and an enhanced concentration of di-adduct compound of the type shown in molecular formula (V) hereinabove. As described more fully hereinbelow, coatings formed using oligomers that contain the di-adduct compound in amounts of at least 2.50 wt % have significantly improved pullout force, tear strength and/or tensile toughness (relative to coatings formed from polyether urethane acrylate compounds alone or polyether urethane acrylate compounds combined with lesser amounts of di-adduct compound) while maintaining a favorable Young's modulus for primary coatings of optical fibers.

Oligomer 3.

Oligomer 3 is a commercial oligomer (obtained from Dymax (product code BR3741). Oligomer 3 was prepared from starting materials similar to those used for Oligomer 1 and Oligomer 2. The ratio n:m:p used in the preparation of Oligomer 3, however, produced a smaller concentration of di-adduct compound.

Preparation of Coating Compositions.

The coating compositions of Table 1 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. The oligomer and monomers (SR504, NVC) of each composition were blended together for at least 10 minutes at 55° C.-60° C. The photoinitiator, antioxidant, and catalyst quencher were then added, and blending was continued for one hour while maintaining a temperature of 55° C.-60° C. Finally, the adhesion promoter was added, and blending was continued for 30 minutes at 55° C.-60° C. to form the coating compositions. Comparative coating compositions D-G were formulated by a vendor and used as received.

Various properties of cured products formed by curing the coating compositions were measured. A discussion of curing conditions, sample configuration and properties follows.

Young's Modulus and Tensile Toughness.

Young's modulus (E) was measured on films formed by the curing coating compositions A, B, and C. Separate films were formed from each coating composition. Wet films of the coating composition were cast on silicone release paper with the aid of a draw-down box having a gap thickness of about 0.005". The wet films were cured with a UV dose of 1.2 $J/cm^2$ (measured over a wavelength range of 225-424 nm by a Light Bug model L490 from International Light) by a Fusion Systems UV curing apparatus with a 600 W/in D-bulb (50% Power and approximately 12 ft/min belt speed) to yield cured coatings in film form. Cured film thickness was between about 0.0030" and 0.0035".

The films were aged (23° C., 50% relative humidity) for at least 16 hours prior to testing. Film samples were cut to dimensions of 12.5 cm×13 mm using a cutting template and a scalpel. Young's modulus, tensile strength at break, and % elongation (% strain at break) were measured at room temperature (approximately 20° C.) on the film samples using a MTS Sintech tensile test instrument following procedures set forth in ASTM Standard D882-97. Young's modulus is defined as the steepest slope of the beginning of the stress-strain curve. Tensile toughness is defined as the integrated area under the stress-strain curve. Films were tested at an elongation rate of 2.5 cm/min with the initial gauge length of 5.1 cm.

Tear Strength.

Tear strength of films formed from coating compositions A-C were measured. Tear strength ($G_c$) is related to the force required to break the coating when the coating is under tension. The tear strength is calculated from Eq. (1):

$$G_c = \frac{\left(\frac{F_{break}}{B \cdot d} \cdot C \cdot \sqrt{\pi \frac{b}{2}}\right)^2}{S} \quad (1)$$

where $F_{break}$ is the force at break, b is the slit length, d is the film thickness, B is the width of the test piece. B and b are instrument parameters with values given below. S is the segment modulus calculated from the stresses at elongations of 0.05% and 2%, and C is a sample geometry factor defined as follows for the technique used herein to determine tear strength:

$$C = \sqrt{\frac{1}{\cos\left(\frac{\pi b}{2B}\right)}} \quad (2)$$

Tear strength ($G_c$) was measured at room temperature (approximately 20° C.) with a MTS Sintech tensile tester. Each coating composition measured was cast on a glass plate with the aid of a draw-down box having a gap thickness of about 0.005" and immediately cured under UV irradiation using a dose of 1 J/cm². The shape and dimensions of the cured films were prepared according to the International Standard ISO 816 (second edition 1983-12-01) "Determination of tear strength of small test pieces (Delft test pieces)". The cured films were conditioned at 23° C.±2° C. and 50% relative humidity (RH) for at least 16 hours. The initial gauge length was 5.0 cm and test speed was set at 0.1 mm/min. Three to five specimens of each film were tested. Tear strength ($G_c$) was calculated from Eqs. (1) and (2). For the test instrument used in the measurements, slit length b was 5.0 mm, width B of the test piece was 9.0 mm, and sample geometry factor C was 1.247.

Pullout Force.

Pullout force was measured at room temperature (approximately 20° C.) on samples of glass fibers coated with each of the coating compositions A-G. Separate glass fibers (diameter 125 µm) were coated with each of the coating compositions A-G. The coating compositions were cured with mercury lamps to form primary coatings on the glass fiber. The thickness of the primary coating was 32.5 µm or less. The primary coating surrounded and was in direct contact with the glass fiber. The fiber samples also included a secondary coating with a thickness of 26 µm or less and a Young's modulus of 1600 MPa. The secondary coatings were formed by applying a secondary coating composition to the (cured) primary coating and curing the secondary coating composition with mercury lamps to form a secondary coating. The secondary coating surrounded and was in direct contact with the primary coating. A ratio of the thickness of the primary coating to the thickness of the secondary coating was in the range of 0.70 to 1.25.

The pullout force test measures the peak force needed to pull a 1 cm length of glass fiber out of a surrounding coating. To perform the test, the coating at each end of the coated fiber was fixed (glued) to separate support surfaces made with a 1 square inch tab of heavy stock paper. The one end of the fiber sample was cut at a distance of 1 cm from the support surface and nicked at the interface with the support surface. The glass fiber was then pulled out of the coating by pulling the two tabs apart and the peak force was determined. The peak force is a measure of the strength of adhesion of the coating to the glass fiber. Additional details of the test procedure follow.

Pullout force measurements were made on fiber samples with a length of five inches. Each end of the fiber sample was glued to a 1"×1" paper tab (heavy stock, comparable to a manila folder). Each end of the fiber sample was oriented perpendicular to an edge of a paper tab and a strip of glue extending a distance of 0.625 inches from the center of the edge toward the center of the tab was applied. The fiber sample was placed on the glue with a portion of the fiber extending slightly beyond the glue. The glue was allowed to dry (about 30 min). The fiber sample was then conditioned in a controlled environment (room temperature and ~50% relative humidity) for at least two hours. A gauge length (1 cm) was defined by cutting the coating at one end of the fiber sample at a position 1 cm from the edge of the tab. The cut extended through the fiber and glue to the tab. The fiber sample was then turned over and the coating of the cut end of the fiber sample was nicked at the edge of the tab. After nicking, the fiber sample was oriented vertically and the tabs were inserted into upper and lower pneumatic grips of a universal tensile machine equipped with a 5 lb load cell (Instron instrument). The tab with the nicked end of the fiber was inserted into the upper grip. The grips were closed and pulled apart at a rate of 5 mm/min until the glass fiber was separated from the coating (approximately two minutes). The force applied was measured as a function of time and recorded to provide a force curve (force as a function of time). Pullout force was defined to be the peak force observed during the pullout test. The pullout force measurements were completed at room temperature.

Figure 3:
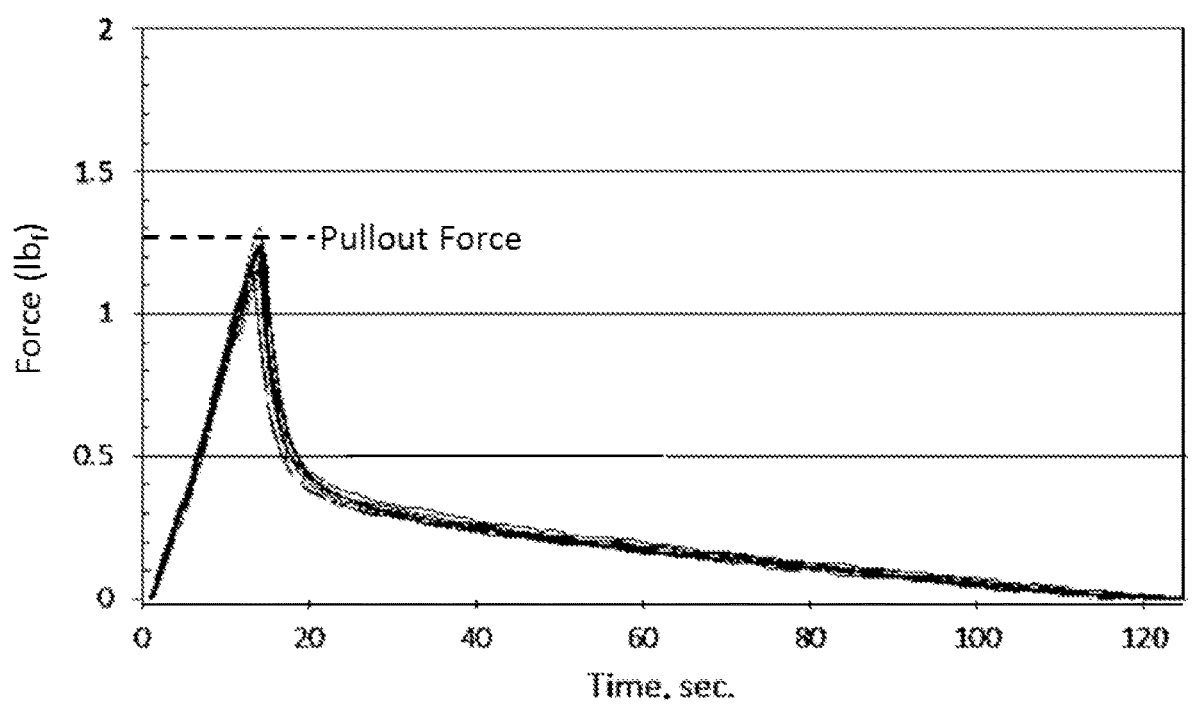
FIG. 3 shows force as a function of time in a pullout force test of a fiber sample.

A representative schematic force curve is shown in FIG. 3. The force was observed to initially increase with time to a peak value and then decreased. The pullout force is the peak force. The decrease in force following the peak force is associated with the frictional force of sliding the coating along the glass fiber. As the coating slides from the glass fiber, the contact area of the coating with the fiber decreases and a commensurate decrease in force is observed. When the coating is fully removed from the glass fiber, the force drops to zero.

Results—Fixed Coating Thickness.

The Young's modulus (E), tear strength ($G_c$), and tensile toughness for cured film samples of coating compositions A-C, and the pullout force results for fiber samples coated with cured products of coating compositions A-C are summarized in Table 4. The pullout force corresponds to pullout force of fiber samples in the as-drawn state described above.

TABLE 4

Properties of Cured Coating Compositions

| | Young's Modulus (E) (MPa) | Tear Strength ($G_c$) (J/m²) | Tensile Toughness (kJ/m³) | Pullout Force (lb/cm) |
|---|---|---|---|---|
| A | 0.57 | 56.1 | | 0.9 |
| B | 1.0 | 47.6 | | 0.9 |
| C | 0.70 | 29.0 | 407 | 1.0 |

The Young's modulus (E) of the present primary coatings have a Young's modulus (E) of less than 1.0 MPa, or less than 0.8 MPa, or less than 0.7 MPa, or less than 0.6 MPa, or less than 0.5 MPa, or in the range from 0.1 MPa-1.0 MPa, or in the range from 0.3 MPa-1.0 MPa, or in the range from 0.45 MPa-1.0 MPa, or in the range from 0.2 MPa-0.9 MPa, or in the range from 0.3 MPa-0.8 MPa, where Young's modulus (E) is determined according to the procedure described herein.

The tear strength ($G_c$) of the present primary coatings is at least 30 J/m², or at least 35 J/m², or at least 40 J/m², or at least 45 J/m², or at least 50 J/m², or at least 55 J/m², or in the range from 30 J/m²-70 J/m², or in the range from 35 J/m²-65 J/m², or in the range from 40 J/m²-60 J/m², where tear strength ($G_c$) is determined according to the procedure described herein.

The tensile toughness of the present primary coatings is greater than 500 kJ/m³, or greater than 600 kJ/m³, or greater than 700 kJ/m³, or greater than 800 kJ/m³, or in the range from 500 kJ/m³ to 1200 kJ/m³, or in the range from 600 kJ/m³ to 1100 kJ/m³, or in the range from 700 kJ/m³ to 1000 kJ/m³, where tensile toughness is determined according to the procedure described herein.

In various embodiments, primary coatings or cured products prepared from a coating composition that includes an oligomer in accordance with the present disclosure have a Young's modulus of less than 1.0 MPa with a tear strength of at least 35 J/m², or a Young's modulus of less than 0.8 MPa with a tear strength of at least 35 J/m², or a Young's modulus of less than 0.6 MPa with a tear strength of at least 35 J/m², or a Young's modulus of less than 0.5 MPa with a tear strength of at least 35 J/m², or a Young's modulus of less than 1.0 MPa with a tear strength of at least 45 J/m², or a Young's modulus of less than 0.8 MPa with a tear strength of at least 45 J/m², or a Young's modulus of less than 0.6 MPa with a tear strength of at least 45 J/m², or a Young's modulus of less than 0.5 MPa with a tear strength of at least 45 J/m², or a Young's modulus of less than 1.0 MPa with a tear strength of at least 55 J/m², or a Young's modulus of less than 0.8 MPa with a tear strength of at least 55 J/m², or a Young's modulus of less than 0.6 MPa with a tear strength of at least 55 J/m², or a Young's modulus of less than 0.5 MPa with a tear strength of at least 55 J/m², where tear strength and Young's modulus are determined according to the procedure described herein.

In various embodiments, primary coatings or cured products prepared from a coating composition that includes an oligomer in accordance with the present disclosure have a Young's modulus in the range from 0.1 MPa-1.0 MPa with a tear strength in the range from 35 J/m²-75 J/m², or a Young's modulus in the range from 0.45 MPa-1.0 MPa with a tear strength in the range from 35 J/m²-75 J/m², or a Young's modulus in the range from 0.3 MPa-0.8 MPa with a tear strength in the range from 35 J/m²-75 J/m², or a Young's modulus in the range from 0.1 MPa-1.0 MPa with a tear strength in the range from 45 J/m²-70 J/m², or a Young's modulus in the range from 0.45 MPa-1.0 MPa with a tear strength in the range from 45 J/m²-70 J/m², or a Young's modulus in the range from 0.3 MPa-0.8 MPa with a tear strength in the range from 45 J/m²-70 J/m², or a Young's modulus in the range from 0.1 MPa-1.0 MPa with a tear strength in the range from 50 J/m²-65 J/m², or a Young's modulus in the range from 0.45 MPa-1.0 MPa with a tear strength in the range from 50 J/m²-65 J/m², or a Young's modulus in the range from 0.3 MPa-0.8 MPa with a tear strength in the range from 50 J/m²-65 J/m², where tear strength and Young's modulus are determined according to the procedure described herein.

FIGS. 4-8 show the time dependence of the pullout force at room temperature (approximately 20° C.) for fiber samples coated with cured products of compositions A-G. Time=0 days corresponds to fiber samples in the as-drawn state described above. The results indicate that pullout force increases as the fiber sample ages and approaches an asymptotic limit at long aging times. The aging behavior can be modeled with Eq. (3):

$$\frac{P(t) - P_0}{P_{Aged} - P_0} = 1 - \exp(-kt) \quad (3)$$

where t is time in days, P(t) is pullout force at time t, $P_0$ is the pullout force of the fiber sample in the as-drawn state, $P_{Aged}$ is the asymptotic limit of pullout force, and k is a time constant. Fits of the model to data is shown in FIGS. 4-6 and yield an approximate time constant k=0.15/day.

Figure 4:
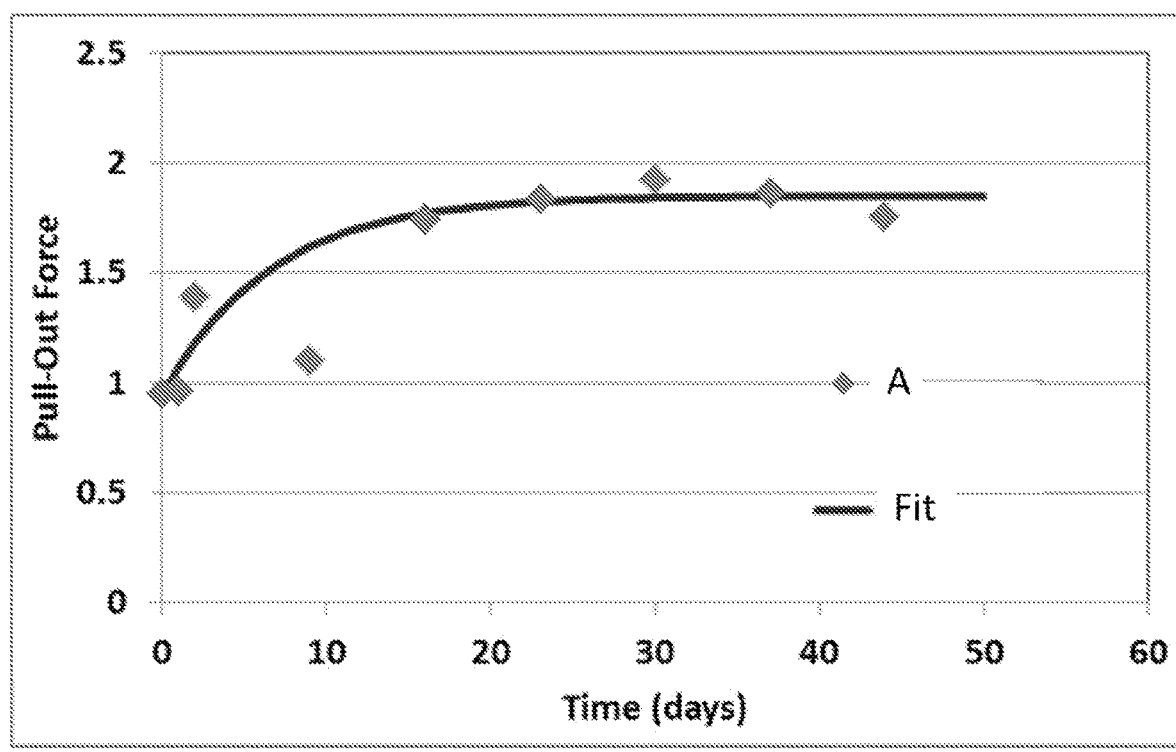
FIG. 4 shows variation in pullout force with time for a fiber sample.
Figure 5:
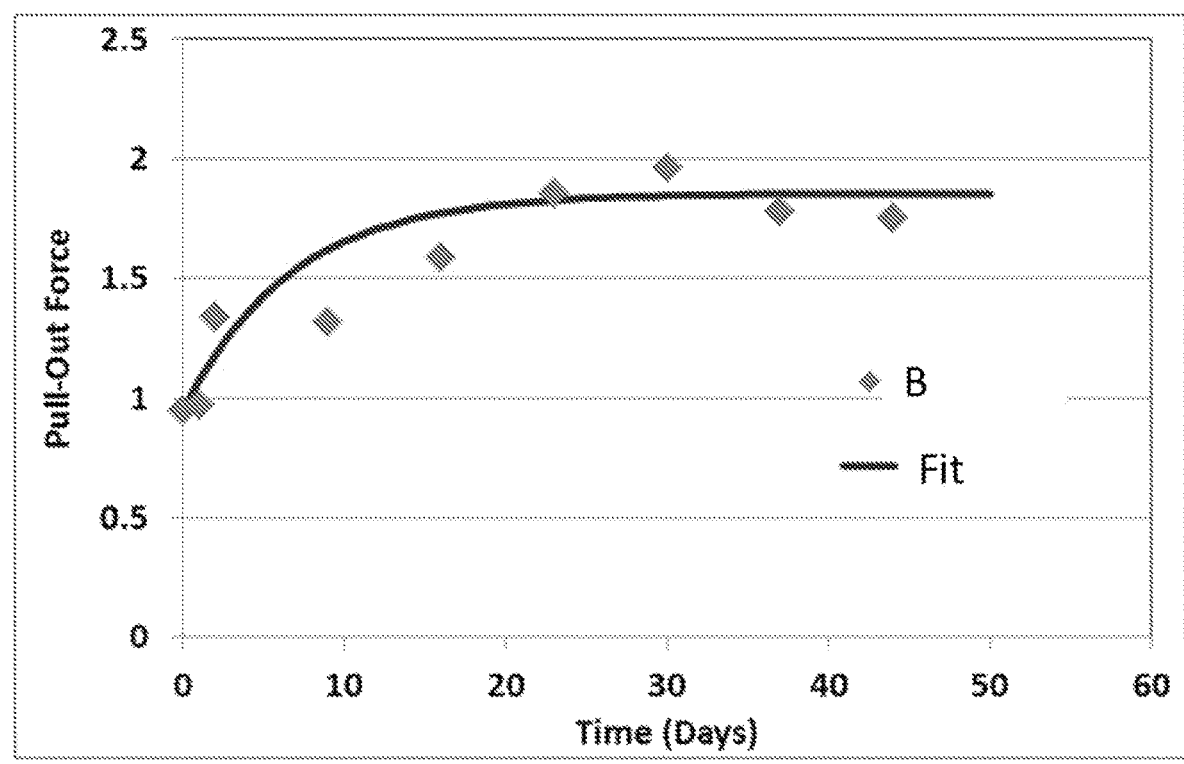
FIG. 5 shows variation in pullout force with time for a fiber sample.
Figure 6:
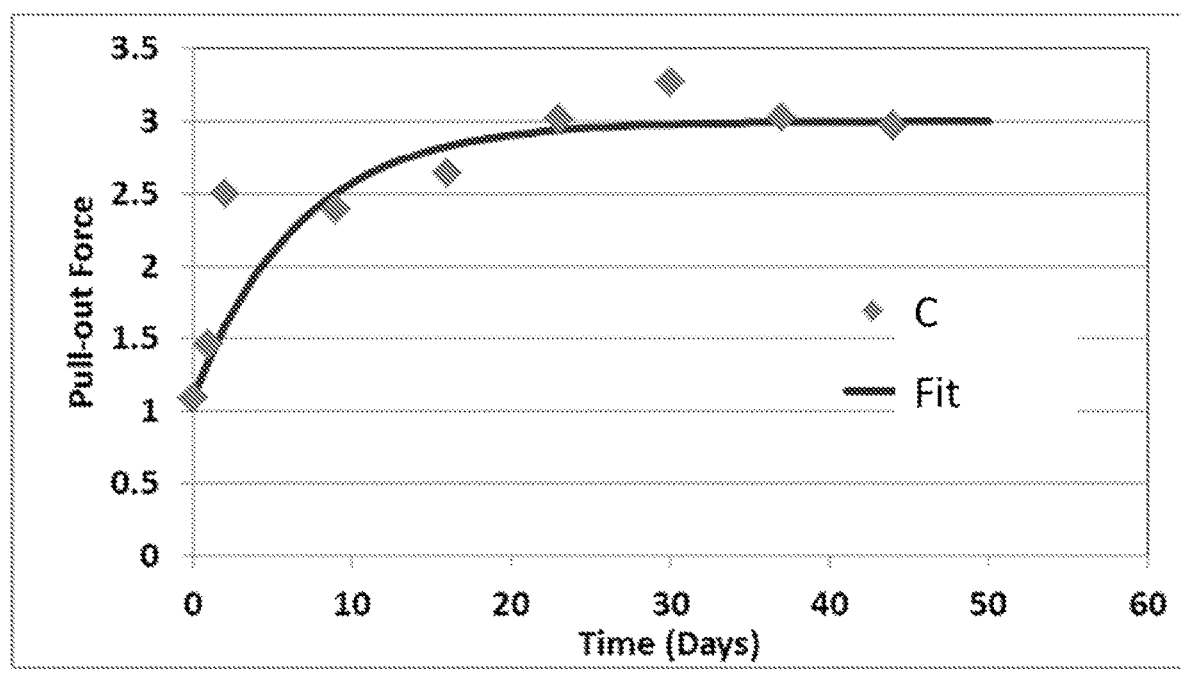
FIG. 6 shows variation in pullout force with time for a fiber sample.
Figure 7:
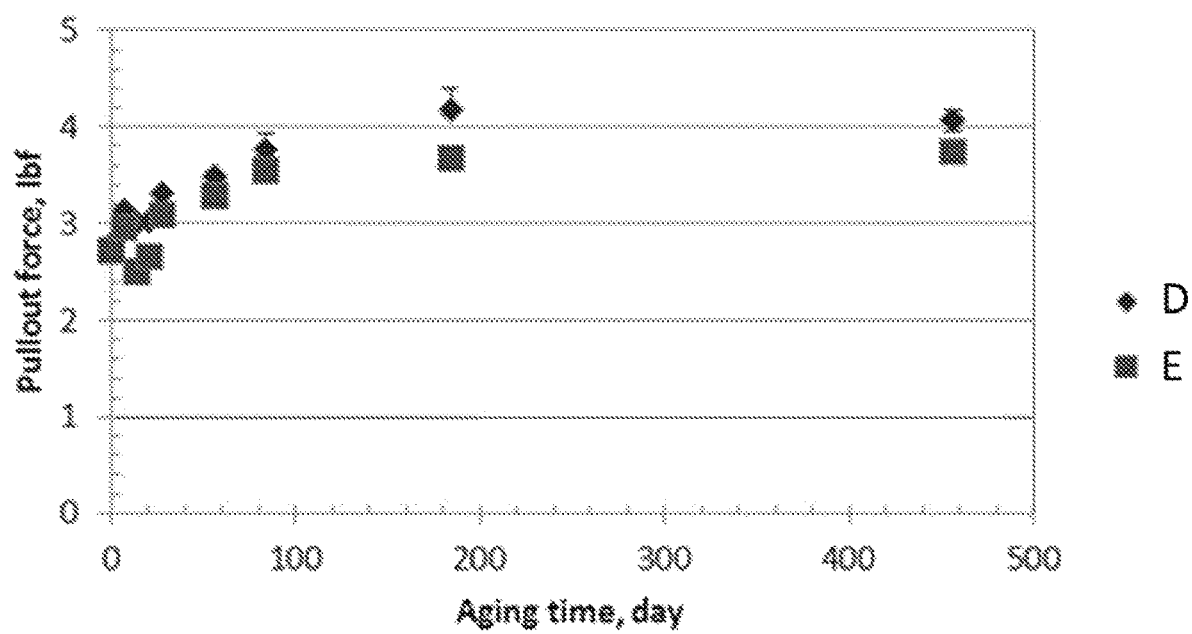
FIG. 7 shows variation in pullout force with time for a fiber sample.
Figure 8:
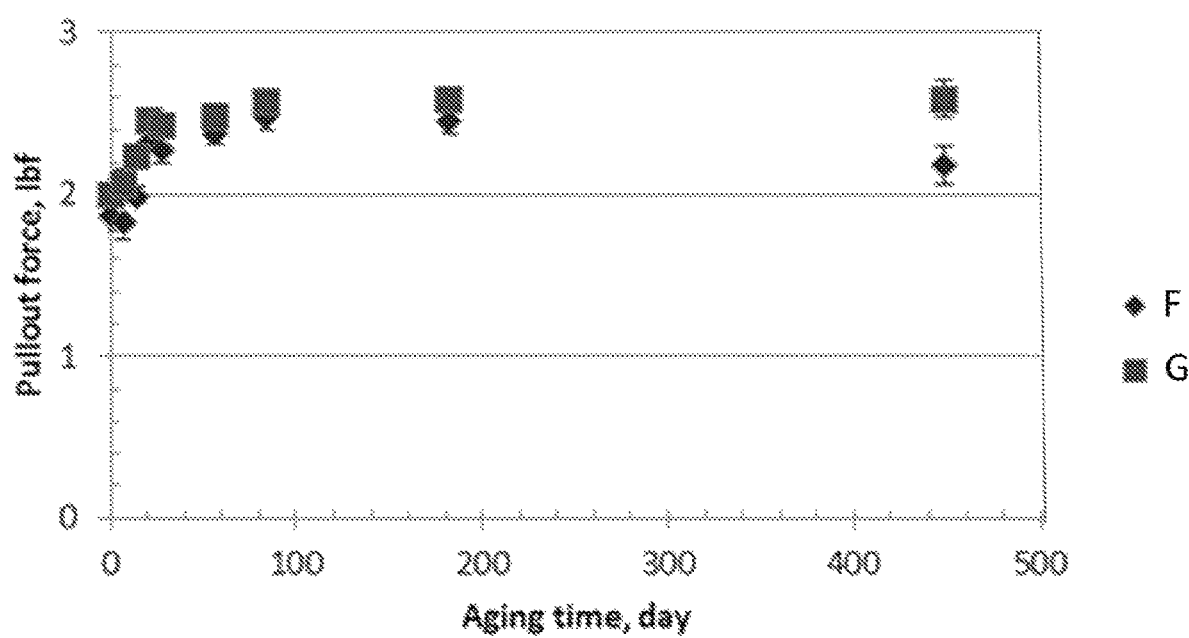
FIG. 8 shows variation in pullout force with time for a fiber sample.

The results shown in FIGS. 4 and 5 indicate that coating compositions A and B provide primary coatings for fiber samples with both a low pullout force in the as-drawn state and a small increase in pullout force over time as the fiber sample ages. The low pullout force in the as-drawn state indicates that adhesion of the primary coating to the glass fiber is adequate to retain the coating on the glass fiber while permitting removal of the coating without leaving residue during a stripping operation. The small increase in pullout force over time indicates that the adhesion properties remain stable and that the coating can be cleanly removed from the fiber over extended periods of time. The coating derived from comparative coating composition C exhibits a low pullout force for fiber samples in the as-drawn state, but a large increase in pullout force as the fiber sample ages (FIG. 6). The large increase in pullout force over time indicates a greater tendency for residue to remain on the fiber during stripping if the fiber is stored for an extended period of time before the stripping operation. Coatings derived from comparative coating compositions D-G show small increases in pullout force over time as the fiber sample ages, but exhibit large pullout forces for fiber samples in the as-drawn state (FIGS. 7-8). The large pullout force in the as-drawn state indicates that the fiber cannot be cleanly stripped and the increase in pullout force over time indicates that the problem becomes more severe over time.

In the course of the present disclosure, it has been determined in one aspect that a primary coating can be stripped cleanly from a glass fiber if the pullout force of a primary coating is less than 1.7 lb$_f$/cm when the fiber is in the as-drawn state and the pullout force increases by less than a factor of 2.0 at room temperature over a time period of 60 or more days beginning from the time the fiber is placed in the as-drawn state, where pullout force is determined according to the procedure described herein.

In one aspect, the pullout force of the primary coatings disclosed herein is less than 1.7 lb$_f$/cm when the fiber is in the as-drawn state and increases by less than a factor of 2.0 over a time period of 60 or more days beginning from the time the fiber is placed in the as-drawn state. In another aspect, the pullout force of the primary coatings disclosed herein is less than 1.7 lb$_f$/cm when the fiber is in the as-drawn state and increases by less than a factor of 1.9 over a time period of 60 or more days beginning from the time the fiber is placed in the as-drawn state. In a further aspect, the pullout force of the primary coatings disclosed herein is less than 1.7 lb$_f$/cm when the fiber is in the as-drawn state and increases by less than a factor of 1.8 over a time period of 60 or more days beginning from the time the fiber is placed in the as-drawn state. In the foregoing, pullout force is determined according to the procedure described herein.

In one aspect, the pullout force of the primary coatings disclosed herein is less than 1.5 lb$_f$/cm when the fiber is in the as-drawn state and increases by less than a factor of 2.0 over a time period of 60 or more days beginning from the time the fiber is placed in the as-drawn state. In another aspect, the pullout force of the primary coatings disclosed herein is less than 1.5 lb$_f$/cm when the fiber is in the as-drawn state and increases by less than a factor of 1.9 over a time period of 60 or more days beginning from the time the fiber is placed in the as-drawn state. In a further aspect, the pullout force of the primary coatings disclosed herein is less than 1.5 lb$_f$/cm when the fiber is in the as-drawn state and increases by less than a factor of 1.8 over a time period of 60 or more days beginning from the time the fiber is placed in the as-drawn state. In the foregoing, pullout force is determined according to the procedure described herein.

In one aspect, the pullout force of the primary coatings disclosed herein is less than 1.3 lb$_f$/cm when the fiber is in the as-drawn state and increases by less than a factor of 2.0 over a time period of 60 or more days beginning from the time the fiber is placed in the as-drawn state. In another aspect, the pullout force of the primary coatings disclosed herein is less than 1.3 lb$_f$/cm when the fiber is in the as-drawn state and increases by less than a factor of 1.9 over a time period of 60 or more days beginning from the time the fiber is placed in the as-drawn state. In a further aspect, the pullout force of the primary coatings disclosed herein is less than 1.3 lb$_f$/cm when the fiber is in the as-drawn state and increases by less than a factor of 1.8 over a time period of 60 or more days beginning from the time the fiber is placed in the as-drawn state. In the foregoing, pullout force is determined according to the procedure described herein.

In one aspect, the pullout force of the primary coatings disclosed herein is less than 1.1 lb$_f$/cm when the fiber is in the as-drawn state and increases by less than a factor of 2.0 over a time period of 60 or more days beginning from the time the fiber is placed in the as-drawn state. In another aspect, the pullout force of the primary coatings disclosed herein is less than 1.1 lb$_f$/cm when the fiber is in the as-drawn state and increases by less than a factor of 1.9 over a time period of 60 or more days beginning from the time the fiber is placed in the as-drawn state. In a further aspect, the pullout force of the primary coatings disclosed herein is less than 1.1 lb$_f$/cm when the fiber is in the as-drawn state and increases by less than a factor of 1.8 over a time period of 60 or more days beginning from the time the fiber is placed in the as-drawn state. In the foregoing, pullout force is determined according to the procedure described herein.

In one aspect, the pullout force of the primary coatings disclosed herein is less than 0.9 lb$_f$/cm when the fiber is in the as-drawn state and increases by less than a factor of 2.0 over a time period of 60 or more days beginning from the time the fiber is placed in the as-drawn state. In another aspect, the pullout force of the primary coatings disclosed herein is less than 0.9 lb$_f$/cm when the fiber is in the as-drawn state and increases by less than a factor of 1.9 over a time period of 60 or more days beginning from the time the fiber is placed in the as-drawn state. In a further aspect, the pullout force of the primary coatings disclosed herein is less than 0.9 lb$_f$/cm when the fiber is in the as-drawn state and increases by less than a factor of 1.8 over a time period of 60 or more days beginning from the time the fiber is placed in the as-drawn state. In the foregoing, pullout force is determined according to the procedure described herein.

In one aspect, the pullout force of the primary coatings disclosed herein is less than 0.7 lb$_f$/cm when the fiber is in the as-drawn state and increases by less than a factor of 2.0 over a time period of 60 or more days beginning from the time the fiber is placed in the as-drawn state. In another aspect, the pullout force of the primary coatings disclosed herein is less than 0.7 lb$_f$/cm when the fiber is in the as-drawn state and increases by less than a factor of 1.9 over a time period of 60 or more days beginning from the time the fiber is placed in the as-drawn state. In a further aspect, the pullout force of the primary coatings disclosed herein is less than 0.7 lb$_f$/cm when the fiber is in the as-drawn state and increases by less than a factor of 1.8 over a time period of 60 or more days beginning from the time the fiber is placed in the as-drawn state. In the foregoing, pullout force is determined according to the procedure described herein.

The pullout force of the present coatings, when configured as a primary coating with a thickness of 32.5 µm on a glass fiber having a diameter of 125 µm and surrounded by a secondary coating with a thickness of 26 µm and Young's modulus of 1600 MPa in the as-drawn state, is less than 1.8 lb$_f$, or less than 1.6 lb$_f$, or less than 1.5 lb$_f$, or less than 1.4 lb$_f$, or less than 1.3 lb$_f$, or in the range from 1.2 lb$_f$ to 1.8 lb$_f$, or in the range from 1.3 lb$_f$ to 1.7 lb$_f$, or in the range from 1.4 lb$_f$ to 1.6 lb$_f$, where pullout force is determined according to the procedure described herein.

Results—Varied Coating Thickness.

Coated optical fibers 10 with reduced outer diameters, OF$_{OD}$, are attractive for reducing the size of cable bundles that incorporate multiple optical fibers 10. Additionally, reduced outer diameters of the optical fibers 10 can reduce manufacturing and/or processing costs due to a decrease in material utilization. Accordingly, optical fibers 10 that maintain the diameter of the glass fiber 11 while decreasing a thickness of the primary coating 16 and a thickness of the secondary coating 18 can be desirable for use in larger density ribbons and larger density cables in an effort to decrease the overall size of the ribbons and/or cables while maintaining the number of individual optical fibers 10. However, during the stripping process of optical fibers 10 having decreased primary coating 16 and secondary coating 18 thickness, an increased load is experienced at the glass-primary coating interface that can lead to shearing of the primary coating 16 such that remnants of the primary coating 16 remain on the stripped portion of the optical fiber 10. Accordingly, it is desirable for the force applied during the stripping process to be below a threshold for the specific attributes of the optical fiber 10. For example, determining the threshold for the applied force during the stripping process for a given optical fiber 10 may take into account the composition of the core 12, the diameter of the core 12, the composition of the cladding 14, the thickness of the cladding 14, the composition of the primary coating 16, the thickness of the primary coating 16, the composition of the secondary coating 18 (if employed), the thickness of the secondary coating 18 (if employed), and/or attributes of the optical fiber 10. The threshold for the applied force during stripping of a given optical fiber 10 may be referred to as a critical pullout force (P$_{crit}$). The critical pullout force, in one example, can be given by Eq. (4):

$$P_{crit} = 462 \cdot R_f \left[ \frac{(1+v_p)\ln(R_p/R_f)}{E_p\left(\frac{1}{E_f R_f^2} + \frac{1}{E_s(R_s^2 - R_p^2)}\right)} \right]^{1/2} \quad (4)$$

where $R_f$ is the radius of the glass fiber 11 in centimeters, $R_p$ is the radius of the primary coating 16 in centimeters, $R_s$ is the radius of the secondary coating 18 in centimeters, $E_f$ is the Young's modulus of the glass fiber 11 in dynes/cm$^2$, $E_p$ is the Young's modulus of the primary coating 16 in dynes/cm$^2$, $E_s$ is the Young's modulus of the secondary coating 18 in dynes/cm$^2$, and $v_p$ is the Poisson ratio of the primary coating 16. The Poisson ratio of a material is a measure of the Poisson effect, the phenomenon in which a material tends to expand in directions that are perpendicular to a direction of compression. Conversely, if the material is stretched rather than compressed, the material tends to contract in the directions that are perpendicular to the direction of stretching. Poisson ratios are often positive, however, in some instances, a material may shrink in the direction that is perpendicular to the direction of compression or the material may expand in the direction that is perpendicular to the direction of stretching, in such instances the Poisson ratio will be negative.

Young's modulus, the coating radius, and the coating thickness for the primary coating 16 and the secondary coating 18, as well as the maximum measured pullout force, for various example optical fibers 10 of the present disclosure are summarized in Table 5. The examples shown in Table 5 held constant the following parameters: the radius of the glass fibers 11 was constant at 62.5 μm, the Young's modulus of the glass fibers 11 was constant at $7.31 \times 10^{11}$ dynes/cm², the Poisson ratio of the primary coating was constant at 0.48, and the ratio of the thickness of the primary coating 16 to the thickness of the secondary coating 18 was constant at 1.25.

TABLE 5

Coating and Pullout Properties of Various Optical Fibers

|  | Primary Coating Modulus (MPa) | Secondary Coating Modulus (MPa) | Primary Coating Radius (μm) | Primary Coating Thickness (μm) | Secondary Coating Radius (μm) | Secondary Coating Thickness (μm) | Max Pullout Force (lb$_f$/cm) |
|---|---|---|---|---|---|---|---|
| Example Fiber 1 | 0.200 | 1600 | 95.00 | 32.50 | 121 | 26.00 | 1.50 |
| Example Fiber 2 | 0.200 | 1600 | 91.67 | 29.17 | 115 | 23.33 | 1.33 |
| Example Fiber 3 | 0.200 | 1600 | 88.89 | 26.39 | 110 | 21.11 | 1.19 |
| Example Fiber 4 | 0.200 | 1600 | 86.11 | 23.61 | 105 | 18.89 | 1.06 |
| Example Fiber 5 | 0.200 | 1600 | 83.33 | 20.83 | 100 | 16.67 | 0.92 |
| Example Fiber 6 | 0.200 | 1600 | 80.56 | 18.06 | 95 | 14.44 | 0.79 |
| Example Fiber 7 | 0.200 | 1600 | 77.78 | 15.28 | 90 | 12.22 | 0.66 |
| Example Fiber 8 | 0.200 | 1600 | 77.78 | 15.28 | 85 | 7.22 | 0.53 |

The primary coatings 16 and the secondary coatings 18 disclosed herein can be applied to an outer surface of the glass fiber 11 and an outer surface of the primary coating 16, respectively, such that optical fibers 10 with outer diameters that are less than 250 μm are obtained. For example, the optical fibers 10 of the present disclosure can be provided with an outer diameter, $OF_{OD}$, of less than 250 μm, less than 240 μm, less than 230 μm, less than 220 μm, less than 210 μm, less than 200 μm, less than 190 μm, less than 180 μm, less than 170 μm, greater than 160 μm, greater than 170 μm, greater than 180 μm, greater than 190 μm, greater than 200 μm, and/or combinations or ranges thereof.

The primary coating 16 can be applied with a thickness in the range of 10-30 μm. For example, the thickness of the primary coating 16 can be less than 30 μm, less than 25 μm, less than 20 μm, less than 15 μm, greater than 10 μm, greater than 15 μm, greater than 20 μm, and/or combinations or ranges thereof. The Young's modulus of the primary coating 16 can be less than 0.5 MPa. For example, the Young's modulus of the primary coating 16 may be 0.4 MPa, 0.3 MPa, 0.2 MPa, 0.1 MPa, and/or combinations or ranges thereof.

The secondary coating 18, when employed, can be applied with a thickness in the range of 5-25 μm. For example, the thickness of the secondary coating 18 can be less than 25 μm, less than 20 μm, less than 15 μm, less than 10 μm, greater than 5 μm, greater than 10 μm, greater than 15 μm, greater than 20 μm, and/or combinations or ranges thereof. In various examples, the optical fiber 10 can be a single mode optical fiber with a glass fiber 11 outer diameter of about 125 μm. The Young's modulus of the secondary coating 18 may be greater than 1,000 MPa. For example, the Young's modulus of the secondary coating 18 can be 1000 MPa, 1200 MPa, 1300 MPa, 1400 MPa, 1500 MPa, 1600 MPa, 1700 MPa, 1800 MPa, 1900 MPa, 2000 MPa, 2100 MPa, 2200 MPa, 2300 MPa, 2400 MPa, 2500 MPa, 2600 MPa, 2700 MPa, 2800 MPa, 2900 MPa, 3000 MPa, and/or combinations or ranges thereof.

The pullout force necessary to remove the coatings (e.g., the primary coating 16 and the secondary coating 18) from the glass fiber 11 may be 1.50 lb$_f$/cm or less. For example, the pullout force may be less than 1.40 lb$_f$/cm, less than 1.30 lb$_f$/cm, less than 1.20 lb$_f$/cm, less than 1.10 lb$_f$/cm, less than 1.00 lb$_f$/cm, less than 0.90 lb$_f$/cm, less than 0.80 lb$_f$/cm, less than 0.70 lb$_f$/cm, less than 0.60 lb$_f$/cm, less than 0.50 lb$_f$/cm, greater than 0.40 lb$_f$/cm, greater than 0.50 lb$_f$/cm, greater than 0.60 lb$_f$/cm, greater than 0.70 lb$_f$/cm, greater than 0.80 lb$_f$/cm, greater than 0.90 lb$_f$/cm, greater than 1.00 lb$_f$/cm, greater than 1.20 lb$_f$/cm, and/or combinations or ranges thereof.

In examples, the optical fiber 10 may be provided with a coating outer diameter, $OF_{OD}$, that is less than or equal to 230 μm, exhibit a pullout force less than or equal to 1.33 lb$_f$/cm when the optical fiber 10 is in an as-drawn state, and exhibit an aged fiber pullout force to as-drawn fiber pullout force ratio of less than 2.0. In some examples, the optical fiber 10 may be provided with a coating outer diameter, $OF_{OD}$, that is less than or equal to 220 μm, exhibit a pullout force less than or equal to 1.20 lb$_f$/cm when the optical fiber 10 is in an as-drawn state, and exhibit an aged fiber pullout force to as-drawn fiber pullout force ratio of less than 2.0. In various examples, the optical fiber 10 may be provided with a coating outer diameter, $OF_{OD}$, that is less than or equal to 210 μm, exhibit a pullout force less than or equal to 1.06 lb$_f$/cm when the optical fiber 10 is in an as-drawn state, and exhibit an aged fiber pullout force to as-drawn fiber pullout force ratio of less than 2.0. In some examples, the optical fiber 10 may be provided with a coating outer diameter, $OF_{OD}$, that is less than or equal to 200 μm, exhibit a pullout force less than or equal to 0.92 lb$_f$/cm when the optical fiber 10 is in an as-drawn state, and exhibit an aged fiber pullout force to as-drawn fiber pullout force ratio of less than 2.0. In various examples, the optical fiber 10 may be provided with a coating outer diameter, $OF_{OD}$, that is less than or equal to 180 µm, exhibit a pullout force less than or equal to 0.66 lb$_f$/cm when the optical fiber 10 is in an as-drawn state, and exhibit an aged fiber pullout force to as-drawn fiber pullout force ratio of less than 2.0. In some examples, the optical fiber 10 may be provided with a coating outer diameter, $OF_{OD}$, that is less than or equal to 170 µm, exhibit a pullout force less than or equal to 0.53 lb$_f$/cm when the optical fiber 10 is in an as-drawn state, and exhibit an aged fiber pullout force to as-drawn fiber pullout force ratio of less than 2.0.

In various examples, a ratio of the thickness of the primary coating 16 to the thickness of the secondary coating 18 can be between 0.70 and 1.25. For example, the ratio of the thickness of the primary coating 16 to the thickness of the secondary coating 18 can be 0.70, 0.75, 0.80, 0.85, 0.90, 0.95, 1.00, 1.05, 1.10, 1.15, 1.20, 1.25 and/or combinations or ranges thereof.

Secondary Coating Compositions.

Representative curable secondary coating compositions are listed in Table 6.

TABLE 6

Secondary Coating Compositions

| Component | Composition | | | |
|---|---|---|---|---|
| | KA | KB | KC | KD |
| SR601 (wt %) | 72.0 | 30.0 | 30.0 | 30.0 |
| SR602 (wt %) | | 37.0 | 37.0 | 37.0 |
| SR349 (wt %) | | | 30.0 | 15.0 |
| SR399 (wt %) | | | | 15.0 |
| SR499 (wt %) | | | | 30.0 |
| CD9038 (wt %) | 10.0 | | | |
| Photomer 3016 (wt %) | 15.0 | | | |
| TPO (wt %) | 1.5 | | | |
| Irgacure 184 (wt %) | 1.5 | | | |
| Irgacure 1850 (wt %) | | 3.0 | 3.0 | 3.0 |
| Irganox 1035 (pph) | 0.5 | | | |
| DC-190 (pph) | 1.0 | | | |

SR601 is ethoxylated (4) bisphenol A diacrylate (a monomer). SR602 is ethoxylated (10) bisphenol A diacrylate (a monomer). SR349 is ethoxylated (2) bisphenol A diacrylate (a monomer). SR399 is dipentaerythritol pentaacrylate. SR499 is ethoxylated (6) trimethylolpropane triacrylate. CD9038 is ethoxylated (30) bisphenol A diacrylate (a monomer). Photomer 3016 is bisphenol A epoxy diacrylate (a monomer). TPO is a photoinitiator. Irgacure 184 is 1-hydroxycyclohexylphenyl ketone (a photoinitiator). Irgacure 1850 is bis(2,6-dimethoxybenzoyl)-2,4,4-trimethylpentylphosphine oxide (a photoinitiator). Irganox 1035 is thiodiethylene bis(3,5-di-tert-butyl)-4-hydroxyhydrocinnamate (an antioxidant). DC190 is silicone-ethylene oxide/propylene oxide copolymer (a slip agent). The concentration unit "pph" refers to an amount relative to a base composition that includes all monomers, oligomers, and photoinitiators. For example, for secondary coating composition KA, a concentration of 1.0 pph for DC-190 corresponds to 1 g DC-190 per 100 g combined of SR601, CD9038, Photomer 3016, TPO, and Irgacure 184.

A comparative curable secondary coating composition (A) and three representative curable secondary coating compositions (SB, SC, and SD) within the scope of the disclosure are listed in Table 7.

TABLE 7

Secondary Coating Compositions

| Component | Composition | | | |
|---|---|---|---|---|
| | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 10.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexyl-phenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coating—Properties.

The Young's modulus, tensile strength at break, and elongation at break of secondary coatings made from secondary compositions A, KA, KB, KC, KD, SB, SC and SD were measured.

Secondary Coating—Properties Measurement—Techniques.

Properties of secondary coatings were determined using the measurement techniques described below:

Tensile Properties.

The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025". The rod samples were cured using a Fusion D bulb at a dose of about 2.4 J/cm$^2$ (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

Glass Transition Temperature.

In situ $T_g$ measurements of primary and secondary coatings were performed on fiber tube-off samples obtained from coated fibers. The coated fibers included a glass fiber having a diameter of 125 µm, a primary coating with thickness 32.5 µm surrounding and in direct contact with the glass fiber, and a secondary coating with thickness 26.0 µm surrounding and in direct contact with the glass fiber. The glass fiber and primary coating were the same for all samples measured. The primary coating was formed from the reference primary coating composition described below. Samples with a comparative secondary coating and a secondary coating in accordance with the present disclosure were measured.

The fiber tube-off samples were obtained using the following procedure: a 0.0055" Miller stripper was clamped down approximately 1 inch from the end of the coated fiber. The one-inch region of fiber was plunged into a stream of liquid nitrogen and held in the liquid nitrogen for 3 seconds. The coated fiber was then removed from the stream of liquid nitrogen and quickly stripped to remove the coating. The stripped end of the fiber was inspected for residual coating. If residual coating remained on the glass fiber, the sample was discarded and a new sample was prepared. The result of the stripping process was a clean glass fiber and a hollow tube of stripped coating that included intact primary and secondary coatings. The hollow tube is referred to as a "tube-off sample". The glass, primary and secondary coating diameter were measured from the end-face of the unstripped fiber.

In-situ Tg of the tube-off samples was run using a Rheometrics DMTA IV test instrument at a sample gauge length of 9 to 10 mm. The width, thickness, and length of the tube-off sample were input to the operating program of the test instrument. The tube-off sample was mounted and then cooled to approximately to 85° C. Once stable, the temperature ramp was run using the following parameters:

Frequency: 1 Hz
Strain: 0.3%
Heating Rate: 2° C./min.
Final Temperature: 150° C.
Initial Static Force=20.0 g
Static>Dynamic Force by=10.0%

The in-situ Tg of a coating is defined as the maximum value of tan δ in a plot of tan δ as a function of temperature, where tan δ is defined as:

tan $\delta = E''/E'$ and E" is the loss modulus, which is proportional to the loss of energy as heat in a cycle of deformation and E' is the storage or elastic modulus, which is proportional to the energy stored in a cycle of deformation.

The tube-off samples exhibited distinct maxima in the tan δ plot for the primary and secondary coatings. The maximum at lower temperature (about −50° C.) corresponded to the in-situ Tg for the primary coating and the maximum at higher temperature (above 50° C.) corresponded to the in-situ Tg for the secondary coating.

In Situ Modulus of Secondary Coating.

For secondary coatings, the in situ modulus was measured using fiber tube-off samples prepared from the fiber samples. A 0.0055 inch Miller stripper was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consisted of a hollow tube with primary and secondary coating. The glass, primary and secondary coating diameter were measured from the end-face of the un-stripped fiber sample.

The fiber tube-off samples were run using a Rheometrics DMTA IV instrument at a sample gauge length 11 mm to obtain the in situ modulus of the secondary coating. The width, thickness, and length were determined and provided as input to the operating software of the instrument. The sample was mounted and run using a time sweep program at ambient temperature (21° C.) using the following parameters:

Frequency: 1 Rad/sec
Strain: 0.3%
Total Time=120 sec.
Time Per Measurement=1 sec
Initial Static Force=15.0 g
Static>Dynamic Force by=10.0%

Once completed, the last five E' (storage modulus) data points were averaged. Each sample was run three times (fresh sample for each run) for a total of fifteen data points. The averaged value of the three runs was reported.

Puncture Resistance of Secondary Coating.

Puncture resistance measurements were made on samples that included a glass fiber, a primary coating, and a secondary coating. The glass fiber had a diameter of 125 µm. The primary coating was formed from the reference primary coating composition listed in Table 8 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the 52$^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 75° diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force. The experiment was repeated with the optical fiber in the same orientation to obtain ten measurement points, which were averaged to determine a puncture resistance for the orientation. A second set of ten measurement points was taken by rotating the orientation of the optical fiber by 180°.

Microbending.

In the wire mesh covered drum test, the attenuation of light at wavelength of 1550 nm through a coated fiber having a length of 750 m was determined at room temperature. The microbend induced attenuation was determined by the difference between a zero-tension deployment and a high-tension deployment on the wire mesh drum. Separate measurements were made for two winding configurations. In the first configuration, the fiber was wound in a zero-tension configuration on an aluminum drum having a smooth surface and a diameter of approximately 400 mm. The zero-tension winding configuration provided a stress-free reference attenuation for light passing through the fiber. After sufficient dwell time, an initial attenuation measurement was performed. In the second winding configuration, the fiber sample was wound to an aluminum drum that was wrapped with fine wire mesh. For this deployment, the barrel surface of the aluminum drum was covered with wire mesh and the fiber was wrapped around the wire mesh. The mesh was wrapped tightly around the barrel without stretching and was kept intact without holes, dips, tearing, or damage. The wire mesh material used in the measurements was made from corrosion-resistant type 304 stainless steel woven wire cloth and had the following characteristics: mesh per linear inch: 165×165, wire diameter: 0.0019", width opening: 0.0041", and open area %: 44.0. A 750 m length of coated fiber was wound at 1 m/s on the wire mesh covered drum at 0.050 cm take-up pitch while applying 80 (+/−1) grams of tension. The ends of the fiber were taped to maintain tension and there were no fiber crossovers. The points of contact of the wound fiber with the mesh impart stress to the fiber and the attenuation of light through the wound fiber is a measure of stress-induced (microbending) losses of the fiber. The wire drum measurement was performed after a dwell time of 1-hour. The increase in fiber attenuation (in dB/km) in the measurement performed in the second configuration (wire mesh covered drum) relative to the first configuration (smooth drum) was determined for each wavelength. The average of three trials was determined at each wavelength and is reported as the wire mesh microbend loss.

Reference Primary Coating.

In measurements of in situ glass transition temperature ($T_g$), puncture resistance, and wire mesh covered drum microbending attenuation, the measurement samples included a primary coating between the glass fiber and a secondary coating. The primary coating composition had the formulation given in Table 8.

TABLE 8

Reference Primary Coating Composition

| Component | Amount |
|---|---|
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercapto propionate) | 0.032 pph | where the oligomeric material was prepared as described above from H12MDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

Secondary Coatings—Properties Tensile—Properties.

The results of tensile property measurements prepared from the curable secondary compositions are shown in Table 9.

TABLE 9

Tensile Properties of Secondary Coatings

| Composition | Tensile Strength (MPa) | Elongation at yield (%) | Yield Strength (MPa) | Young's Modulus (MPa) |
|---|---|---|---|---|
| KA | 54.3 | 39.0 | | 1528 |
| KB | 63.1 | 24.1 | | 1703 |
| KC | 45.7 | 28.4 | | 1242 |
| KD | 61.8 | 32.5 | | 1837 |
| A | 86.09 | 4.60 | 48.21 | 2049 |
| SB | 75.56 | 4.53 | 61.23 | 2532 |
| SC | 82.02 | 4.76 | 66.37 | 2653 |
| SD | 86.08 | 4.87 | 70.05 | 2776 |

The results show that secondary coatings prepared from compositions SB, SC, and SD exhibited higher Young's modulus, and higher yield strength than the secondary coating prepared from comparative composition A. The higher values represent improvements that make secondary coatings prepared for the curable coating compositions disclosed herein better suited for small diameter optical fibers. More specifically, the higher values enable use of thinner secondary coatings on optical fibers without sacrificing performance. Thinner secondary coatings reduce the overall diameter of the optical fiber and provide higher fiber counts in cables of a given cross-sectional area.

The Young's modulus of secondary coatings prepared as cured products from the curable secondary coating compositions disclosed herein is greater than 1500 MPa, or greater than 1600 MPa, or greater than 1700 MPa, or greater than 1800 MPa, or greater than 1900 MPa, or greater than 2000 MPa, or greater than 2100 MPa, or greater than 2200 MPa, or greater than 2300 MPa, or greater than 2400 MPa, or greater than 2500 MPa, or greater than 2600 MPa, or greater than 2700 MPa, or in the range from 2400 MPa to 3000 MPa, or in the range from 2600 MPa to 2800 MPa.

The yield strength of secondary coatings prepared as cured products from the curable secondary coating compositions disclosed herein is greater than 55 MPa, or greater than 60 MPa, or greater than 65 MPa, or greater than 70 MPa, or in the range from 55 MPa to 75 MPa, or in the range from 60 MPa to 70 MPa.

Secondary Coatings—Properties—Puncture Resistance.

Figure 11:
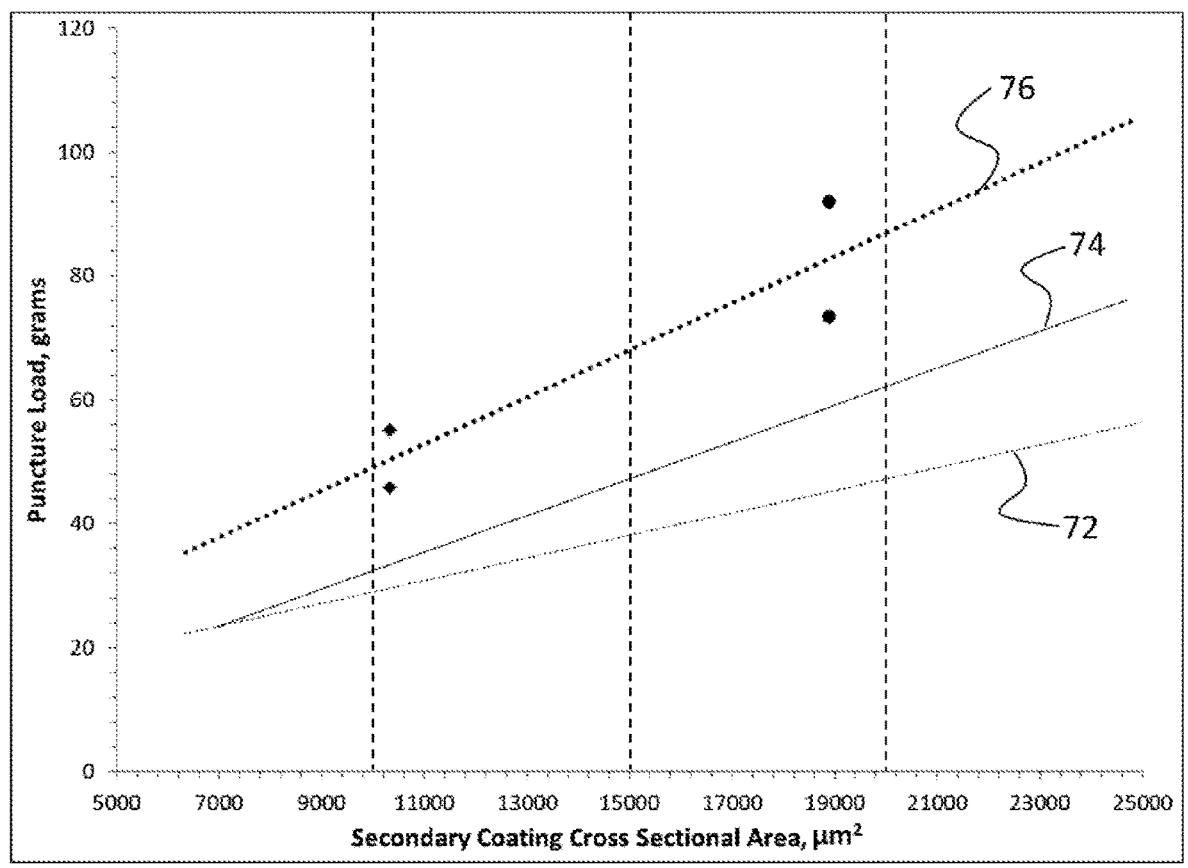
FIG. 11 shows the dependence of puncture load on cross-sectional area for three secondary coatings.

The puncture resistance of secondary coatings made from comparative curable secondary coating composition A, a commercial curable secondary coating composition (CPC6e) from a commercial vendor (DSM Desotech) having a proprietary composition, and curable secondary coating composition SD was determined according to the method described above. Several fiber samples with each of the three secondary coatings were prepared. Each fiber sample included a glass fiber with a diameter of 125 µm, a primary coating formed from the reference primary coating composition listed in Table 8, and one of the three secondary coatings. Samples with various secondary coatings were prepared. The thicknesses of the primary coating and secondary coating were adjusted to vary the cross-sectional area of the secondary coating as shown in FIG. 11. The ratio of the thickness of the secondary coating to the thickness of the primary coating was maintained at about 0.8 for all samples Fiber samples with a range of thicknesses were prepared for each of the secondary coatings to determine the dependence of puncture load on the thickness of the secondary coating. One strategy for achieving higher fiber count in cables is to reduce the thickness of the secondary coating. As the thickness of the secondary coating is decreased, however, its performance diminishes and its protective function is compromised. Puncture resistance is a measure of the protective function of a secondary coating. A secondary coating with a high puncture resistance withstands greater impact without failing and provides better protection for the glass fiber.

The puncture load as a function of cross-sectional area for the three coatings is shown in FIG. 11. Cross-sectional area is selected as a parameter for reporting puncture load because an approximately linear correlation of puncture load with cross-sectional area of the secondary coating was observed. Traces 72, 74, and 76 shows the approximate linear dependence of puncture load on cross-sectional area for the comparative secondary coatings obtained by curing the comparative CPC6e secondary coating composition, the comparative curable secondary coating composition A, and curable secondary coating composition SD; respectively. The vertical dashed lines are provided as guides to the eye at cross-sectional areas of 10000 µm², 15000 µm², and 20000 µm² as indicated.

The CPC6e secondary coating depicted in Trace 72 corresponds to a conventional secondary coating known in the art. The comparative secondary coating A depicted in Trace 74 shows an improvement in puncture load for high cross-sectional areas. The improvement, however, diminishes as the cross-sectional area decreases. This indicates that a secondary coating obtained as a cured product from comparative curable secondary coating composition A is unlikely to be suitable for low diameter, high fiber count applications. Trace 76, in contrast, shows a significant increase in puncture load for the secondary coating obtained as a cured product from curable secondary coating composition SD. At a cross-sectional area of 7000 µm², for example, the puncture load of the secondary coating obtained from curable secondary coating composition SD is 50% or more greater than the puncture load of either of the other two secondary coatings.

The puncture load of secondary coatings formed as cured products of the curable secondary coating compositions disclosed herein at a cross-sectional area of 10000 µm² is greater than 36 g, or greater than 40 g, or greater than 44 g, or greater than 48 g, or in the range from 36 g to 52 g, or in the range from 40 g to 48 g. The puncture load of secondary coatings formed as cured products of the curable secondary coating compositions disclosed herein at a cross-sectional area of 15000 µm² is greater than 56 g, or greater than 60 g, or greater than 64 g, or greater than 68 g, or in the range from 56 g to 72 g, or in the range from 60 g to 68 g. The puncture load of secondary coatings formed as cured products of the curable secondary coating compositions disclosed herein at a cross-sectional area of 20000 µm² is greater than 68 g, or greater than 72 g, or greater than 76 g, or greater than 80 g, or in the range from 68 g to 92 g, or in the range from 72 g to 88 g. Embodiments include secondary coatings having any combination of the foregoing puncture loads.

As used herein, normalized puncture load refers to the ratio of puncture load to cross-sectional area. The puncture load of secondary coatings 18 formed as cured products of the curable secondary coating compositions disclosed herein have a normalized puncture load greater than $3.2 \times 10^{-4}$ g/µm², or greater than $3.6 \times 10^{-4}$ g/µm², or greater than $4.0 \times 10^{-4}$ g/µm², or greater than $4.4 \times 10^{-4}$ g/µm², or greater than $4.8 \times 10^{-4}$ g/µm², or in the range from $3.2 \times 10^{-4}$ g/µm² to $5.6 \times 10^{-4}$ µg/m², or in the range from $3.6 \times 10^{-4}$ g/µm² to $5.2 \times 10^{-4}$ g/µm², or in the range from $4.0 \times 10^{-4}$ µg/m² to $4.8 \times 10^{-4}$ g/µm².

According to a first aspect of the present disclosure, an optical fiber includes an outer diameter, $OF_{OD}$, of less than 220 µm, a glass core defining a centerline, CL, through a center thereof, a glass cladding surrounding and in direct contact with the glass core, a primary coating surrounding and in direct contact with the glass cladding, and a secondary coating surrounding and in direct contact with the primary coating. The glass core and the glass cladding define a glass fiber. An outer circumference of the glass fiber has a radius from the centerline given by $R_f$ in centimeters. The primary coating has an outer circumference with a radius from the centerline given by $R_p$ in centimeters. The primary coating has a thickness of less than 30 µm and a Young's modulus less than 0.5 MPa. An outer diameter of the secondary coating has a radius from the centerline given by $R_s$ in centimeters. The secondary coating has a thickness less than 27.5 µm. The optical fiber has a pullout force that is less than a critical pullout force ($P_{crit}$) that is given by the equation:

$$P_{crit} = 462 \cdot R_f \left[ \frac{(1 + v_p)\ln(R_p/R_f)}{E_p \left( \frac{1}{E_f R_f^2} + \frac{1}{E_s(R_s^2 - R_p^2)} \right)} \right]^{1/2},$$

where $E_f$ is a Young's modulus of the glass fiber, $E_p$ is the Young's modulus of the primary coating, and $E_s$ is a Young's modulus of the secondary coating in dynes/cm², and $v_p$ is a Poisson ratio of the primary coating.

In various examples of the first aspect, the Young's modulus of the primary coating can be less than 0.4 MPa or less than 0.3 MPa. In some examples, the pullout force of the optical fiber can be less than 1.05 lb$_f$/cm, less than 0.90 lb$_f$/cm, or less than 0.65 lb$_f$/cm. In various examples, the pullout force may increase by less than a factor of 1.8 or less than a factor of 1.6 upon aging the optical fiber for at least 60 days. In some examples, a tear strength of the primary coating can be greater than 30 J/m², greater than 40 J/m², or greater than 50 J/m². In various examples, a tensile toughness of the primary coating can be in the range from 500 kJ/m³-1200 kJ/m³, such as greater than 500 kJ/m³ or greater than 700 kJ/m³. In examples, the outer diameter of the optical fiber, OF$_{OD}$, can be less than 210 μm, less than 200 μm, or less than 180 μm. In some examples, the thickness of the primary coating can be less than 25 μm or less than 20 μm. In various examples, the secondary coating can have a thickness of less than 25 μm or less than 20 μm. In examples, the primary coating thickness and the secondary coating thickness can each be less than 25 μm or less than 20 μm. In some examples, a ratio of the thickness of the primary coating to the thickness of the secondary coating can be between 0.7 and 1.25. In one specific example, the pullout force can be less than 1.06 lb$_f$/cm when the outer diameter, OF$_{OD}$, is less than 210 μm. In another specific example, the pullout force can be less than 0.92 lb$_f$/cm when the outer diameter, OF$_{OD}$, is less than 200 μm. In yet another specific example, the pullout force is less than 0.66 lb$_f$/cm when the outer diameter, OF$_{OD}$, is less than 180 μm. In various examples, a puncture resistance of the secondary coating can have a normalized puncture load greater than 4.4×10⁻⁴ g/μm². One of skill in the art will recognize that the optical fibers disclosed herein may be incorporated into an optical fiber ribbon that has a plurality of the optical fibers of the present disclosure.

According to a second aspect of the present disclosure, an optical fiber includes an outer diameter, OF$_{OD}$, less than 220 μm, a glass fiber that includes a glass core and a glass cladding, a primary coating, and a secondary coating. The glass cladding surrounds and is in direct contact with the glass core. The primary coating surrounds and is in direct contact with the glass fiber. The primary coating can have a Young's modulus less than 0.5 MPa and a thickness less than 30.0 μm. The secondary coating surrounds and is in direct contact with the primary coating. The secondary coating can have a thickness less than 25.0 μm. A pullout force of the optical fiber can be less than 1.35 lb$_f$/cm when in an as-drawn state. The pullout force may increase by less than a factor of 2.0 upon aging the primary and secondary coatings on the glass fiber for at least 60 days.

In various examples of the second aspect, the Young's modulus of the primary coating can be less than 0.3 MPa. In some examples, a tensile toughness of the primary coating is in the range from 500 kJ/m³-1200 kJ/m³. In examples, a ratio of a thickness of the secondary coating to the thickness of the primary coating is between 0.7 and 1.25. In some specific examples, the pullout force is less than 1.06 lb$_f$/cm when the outer diameter, OF$_{OD}$, is less than 210 μm. In other specific examples, the pullout force is less than 0.92 lb$_f$/cm when the outer diameter, OF$_{OD}$, is less than 200 μm. In various specific examples, the pullout force is less than 0.66 lb$_f$/cm when the outer diameter, OF$_{OD}$, is less than 180 μm. In examples, the pullout force may increase by less than a factor of 1.8 or less than a factor of 1.6 upon aging the optical fiber for at least 60 days. In some examples, a tear strength of the primary coating can be greater than 30 J/m², greater than 40 J/m², or greater than 50 J/m².

According to a third aspect of the present disclosure, a method of designing an optical fiber includes the steps of: (a) selecting a glass fiber, the glass fiber having a modulus E, the glass fiber having a glass core and a glass cladding surrounding and directly contacting the glass core, the glass cladding having a radius R$_f$, (b) selecting the radius R$_f$ for the glass cladding; (c) selecting a primary coating to surround and directly contact the glass cladding, the primary coating having a Young's modulus E$_p$, a Poisson's ratio of v$_p$, and a radius R$_p$; (d) selecting a secondary coating to surround and directly contact the primary coating, the secondary coating having a Young's modulus E$_s$ and a radius R$_s$; and (e) configuring the selection of E$_f$, R$_f$, E$_p$, R$_p$, E$_s$, and R$_s$ such that the optical fiber has a pullout force less than P$_{crit}$, wherein P$_{crit}$ is given by $$P_{crit} = 462 \cdot R_f \left[ \frac{(1+v_p)\ln(R_p/R_f)}{E_p\left(\frac{1}{E_f R_f^2} + \frac{1}{E_s(R_s^2 - R_p^2)}\right)} \right]^{1/2}.$$

In various examples of the third aspect, the pullout force is less than 1.05 lb$_f$/cm, less than 0.90 lb$_f$/cm, or less than 0.65 lb$_f$/cm. In some examples, the step of selecting a primary coating to surround and directly contact the glass cladding may further include selecting a thickness of the primary coating that is in the range of greater than 15 μm to less than 30 μm. In examples, the step of selecting a secondary coating to surround and directly contact the primary coating may further include selecting a thickness of the secondary coating that is in the range of greater than 7.0 μm to less than 25 μm.

According to a fourth aspect of the present disclosure, a method of manufacturing an optical fiber includes the steps of: (a) heating a preform in a furnace, with the preform including a glass core and a glass cladding that surrounds and directly contacts the glass core; (b) drawing the preform to form a glass fiber with a diameter of less than 130 μm, the glass fiber having a modulus E$_f$ and a radius R$_f$; (c) applying a primary coating to surround and directly contact the glass cladding, the primary coating having a Young's modulus, E$_p$, less than 0.5 MPa, a thickness of less than 30 μm, a Poisson's ratio of v$_p$, and a radius R$_p$; and (d) applying a secondary coating to surround and directly contact the primary coating, the secondary coating having a Young's modulus, E$_s$, greater than 1500 MPa, a radius R$_s$, and a thickness less than 25 μm.

In various example of the fourth aspect of the present disclosure, the method of manufacturing an optical fiber can further include the step of testing a pullout force of the optical fiber to ensure the pullout force is less than P$_{crit}$, where P$_{crit}$ is given by:

$$P_{crit} = 462 \cdot R_f \left[ \frac{(1+v_p)\ln(R_p/R_f)}{E_p\left(\frac{1}{E_f R_f^2} + \frac{1}{E_s(R_s^2 - R_p^2)}\right)} \right]^{1/2}.$$

In some examples, the pullout force can be less than 1.05 lb$_f$/cm, less than 0.90 lb$_f$/cm, or less than 0.65 lb$_f$/cm. In examples, the thickness of the primary coating can be in the range of greater than 15 μm to less than 30 μm. In various examples, the thickness of the secondary coating can be in the range of greater than 7.0 μm to less than 25 μm.

Aspect 1 of the description is:

An optical fiber, comprising:
- an outer diameter of less than 220 µm;
- a glass core defining a centerline through a center thereof,
- a glass cladding surrounding and in direct contact with the glass core, the glass core and the glass cladding defining a glass fiber, an outer circumference of the glass fiber having a radius from the centerline given by $R_f$ in centimeters;
- a primary coating surrounding and in direct contact with the glass cladding, an outer circumference of the primary coating having a radius from the centerline given by $R_p$ in centimeters, the primary coating having a thickness less than 30 µm and a Young's modulus less than 0.5 MPa;
- a secondary coating surrounding and in direct contact with the primary coating, an outer diameter of the secondary coating having a radius from the centerline given by $R_s$ in centimeters, the secondary coating having a thickness less than 27.5 µm; and
- a pullout force that is less than a critical pullout force ($P_{crit}$) that is given by the equation:

$$P_{crit} = 462 \cdot R_f \left[ \frac{(1+v_p)\ln(R_p/R_f)}{E_p\left(\frac{1}{E_f R_f^2} + \frac{1}{E_s(R_s^2 - R_p^2)}\right)} \right]^{1/2},$$

where $E_f$ is a Young's modulus of the glass fiber in dynes/cm², $E_p$ is the Young's modulus of the primary coating in dynes/cm², and $E_s$ is a Young's modulus of the secondary coating in dynes/cm², and $v_p$ is a Poisson ratio of the primary coating.

Aspect 2 of the description is:
The optical fiber of Aspect 1, wherein the Young's modulus of the primary coating is less than 0.4 MPa.

Aspect 3 of the description is:
The optical fiber of Aspect 1, wherein the Young's modulus of the primary coating is less than 0.3 MPa.

Aspect 4 of the description is:
The optical fiber of any of Aspects 1-3, wherein the pullout force is less than 1.05 $lb_f$/cm.

Aspect 5 of the description is:
The optical fiber of any of Aspects 1-3, wherein the pullout force is less than 0.90 $lb_f$/cm.

Aspect 6 of the description is:
The optical fiber of any of Aspects 1-3, wherein the pullout force is less than 0.65 $lb_f$/cm.

Aspect 7 of the description is:
The optical fiber of any of Aspects 1-6, wherein the pullout force increases by less than a factor of 1.8 upon aging the optical fiber for at least 60 days.

Aspect 8 of the description is:
The optical fiber of any of Aspects 1-6, wherein the pullout force increases by less than a factor of 1.6 upon aging the optical fiber for at least 60 days.

Aspect 9 of the description is:
The optical fiber of any of Aspects 1-8, wherein a tear strength of the primary coating is greater than 30 J/m².

Aspect 10 of the description is:
The optical fiber of any of Aspects 1-8, wherein a tear strength of the primary coating is greater than 40 J/m².

Aspect 11 of the description is:
The optical fiber of any of Aspects 1-8, wherein a tear strength of the primary coating is greater than 50 J/m².

Aspect 12 of the description is:
The optical fiber of any of Aspects 1-8, wherein a tensile toughness of the primary coating is greater than 500 kJ/m³.

Aspect 13 of the description is:
The optical fiber of any of Aspects 1-8, wherein a tensile toughness of the primary coating is greater than 700 kJ/m³.

Aspect 14 of the description is:
The optical fiber of any of Aspects 1-8, wherein a tensile toughness of the primary coating is in the range from 500 kJ/m³-1200 kJ/m³.

Aspect 15 of the description is:
The optical fiber of any of Aspects 1-14, wherein the outer diameter of the optical fiber is less than 210 µm.

Aspect 16 of the description is:
The optical fiber of any of Aspects 1-14, wherein the outer diameter of the optical fiber is less than 200 µm.

Aspect 17 of the description is:
The optical fiber of any of Aspects 1-14, wherein the outer diameter of the optical fiber is less than 180 µm.

Aspect 18 of the description is:
The optical fiber of any of Aspects 1-17, wherein the thickness of the primary coating is less than 25 µm.

Aspect 19 of the description is:
The optical fiber of any of Aspects 1-17, wherein the thickness of the primary coating is less than 20 µm.

Aspect 20 of the description is:
The optical fiber of any of Aspects 1-19, wherein the secondary coating has a thickness of less than 25 µm.

Aspect 21 of the description is:
The optical fiber of any of Aspects 1-19, wherein the secondary coating has a thickness of less than 20 µm.

Aspect 22 of the description is:
The optical fiber of any of Aspects 1-17, wherein the primary coating thickness and the secondary coating thickness are each less than 25 µm.

Aspect 23 of the description is:
The optical fiber of any of Aspects 1-17, wherein the primary coating thickness and the secondary coating thickness are each less than 20 µm.

Aspect 24 of the description is:
The optical fiber of any of Aspects 1-23, wherein a ratio of the thickness of the primary coating to the thickness of the secondary coating is between 0.7 and 1.25.

Aspect 25 of the description is:
The optical fiber of any of Aspects 1-24, wherein the pullout force is less than 1.06 $lb_f$/cm and the outer diameter is less than 210 µm.

Aspect 26 of the description is:
The optical fiber of any of Aspects 1-24, wherein the pullout force is less than 0.92 $lb_f$/cm and the outer diameter is less than 200 µm.

Aspect 27 of the description is:
The optical fiber of any of Aspects 1-24, wherein the pullout force is less than 0.66 $lb_f$/cm and the outer diameter is less than 180 µm.

Aspect 28 of the description is:
The optical fiber of any of Aspects 1-27, wherein a puncture resistance of the secondary coating has a normalized puncture load greater than $4.4 \times 10^{-4}$ g/µm².

Aspect 29 of the description is: An optical fiber ribbon comprising a plurality of the optical fibers of any of Aspects 1-28.

Aspect 30 of the description is:
An optical fiber, comprising:
- an outer diameter less than 220 µm;
- a glass fiber comprising a glass core and a glass cladding, the glass cladding surrounding and in direct contact with the glass core;

a primary coating surrounding and in direct contact with the glass fiber, the primary coating having a Young's modulus less than 0.5 MPa and a thickness less than 30.0 µm;

a secondary coating surrounding and in direct contact with the primary coating, the secondary coating having a thickness less than 25.0 µm; and a pullout force less than 1.35 lb$_f$/cm when in an as-drawn state, the pullout force increasing by less than a factor of 2.0 upon aging the primary and secondary coatings on the glass fiber for at least 60 days.

Aspect 31 of the description is:
The optical fiber of Aspect 30, wherein the Young's modulus of the primary coating is less than 0.3 MPa.

Aspect 32 of the description is:
The optical fiber of Aspect 30 or 31, wherein a tensile toughness of the primary coating is in the range from 500 kJ/m³-1200 kJ/m³.

Aspect 33 of the description is:
The optical fiber of any of Aspects 30-32, wherein a ratio of a thickness of the secondary coating to the thickness of the primary coating is between 0.7 and 1.25.

Aspect 34 of the description is:
The optical fiber of any of Aspects 30-33, wherein the pullout force is less than 1.06 lb$_f$/cm and the outer diameter is less than 210 µm.

Aspect 35 of the description is:
The optical fiber of any of Aspects 30-33, wherein the pullout force is less than 0.92 lb$_f$/cm and the outer diameter is less than 200 µm.

Aspect 36 of the description is:
The optical fiber of any of Aspects 30-33, wherein the pullout force is less than 0.66 lb$_f$/cm and the outer diameter is less than 180 µm.

Aspect 37 of the description is:
The optical fiber of any of Aspects 30-36, wherein the pullout force increases by less than a factor of 1.8 upon aging the optical fiber for at least 60 days.

Aspect 38 of the description is:
The optical fiber of any of Aspects 30-36, wherein the pullout force increases by less than a factor of 1.6 upon aging the optical fiber for at least 60 days.

Aspect 39 of the description is:
The optical fiber of any of Aspects 30-38, wherein a tear strength of the primary coating is greater than 30 J/m².

Aspect 40 of the description is:
The optical fiber of any of Aspects 30-38, wherein a tear strength of the primary coating is greater than 40 J/m².

Aspect 41 of the description is:
The optical fiber of any of Aspects 30-38, wherein a tear strength of the primary coating is greater than 50 J/m².

Aspect 42 of the description is:
A method of designing an optical fiber, the method comprising:

(a) selecting a glass fiber, the glass fiber having a modulus $E_f$, the glass fiber having a glass core and a glass cladding surrounding and directly contacting the glass core, the glass cladding having a radius $R_f$;

(b) selecting a primary coating to surround and directly contact the glass cladding, the primary coating having a Young's modulus $E_p$, a Poisson's ratio of $v_p$, and a radius $R_p$;

(c) selecting a secondary coating to surround and directly contact the primary coating, the secondary coating having a Young's modulus $E_s$ and a radius $R_s$; and (d) configuring the selection of the glass fiber, the primary coating, and the secondary coating such that the optical fiber has a pullout force less than $P_{crit}$, wherein $P_{crit}$ is given by $$P_{crit} = 462 \cdot R_f \left[ \frac{(1+v_p)\ln(R_p/R_f)}{E_p\left(\frac{1}{E_f R_f^2} + \frac{1}{E_s(R_s^2 - R_p^2)}\right)} \right]^{1/2}.$$

Aspect 43 of the description is:
The method of designing an optical fiber of Aspect 42, wherein the pullout force is less than 1.05 lb$_f$/cm.

Aspect 44 of the description is:
The method of designing an optical fiber of Aspect 42, wherein the pullout force is less than 0.90 lb$_f$/cm.

Aspect 45 of the description is:
The method of designing an optical fiber of Aspect 42, wherein the pullout force is less than 0.65 lb$_f$/cm.

Aspect 46 of the description is:
The method of designing an optical fiber of any of Aspects 42-45, wherein the step of selecting a primary coating to surround and directly contact the glass cladding further comprises selecting a thickness of the primary coating that is in the range of greater than 15 µm to less than 30 µm.

Aspect 47 of the description is:
The method of designing an optical fiber of Aspect 46, wherein the step of selecting a secondary coating to surround and directly contact the primary coating further comprises selecting a thickness of the secondary coating that is in the range of greater than 7.0 µm to less than 25 µm.

Aspect 48 of the description is:
A method of manufacturing an optical fiber, the method comprising:

(a) heating a preform in a furnace, wherein the preform includes a glass core and a glass cladding that surrounds and directly contacts the glass core;

(b) drawing the preform to form a glass fiber having a diameter of less than 130 µm, the glass fiber having a modulus $E_f$ and a radius $R_f$;

(c) applying a primary coating to surround and directly contact the glass cladding, the primary coating having a Young's modulus, $E_p$, less than 0.5 MPa, a thickness of less than 30 µm, a Poisson's ratio of $v_p$, and a radius $R_p$; and (d) applying a secondary coating to surround and directly contact the primary coating, the secondary coating having a Young's modulus, $E_s$, greater than 1500 MPa, a radius $R_s$, and a thickness less than 25 µm.

Aspect 49 of the description is:
The method of manufacturing an optical fiber of Aspect 48, further comprising: testing a pullout force of the optical fiber to ensure the pullout force is less than $P_{crit}$, wherein $P_{crit}$ is given by $$P_{crit} = 462 \cdot R_f \left[ \frac{(1+v_p)\ln(R_p/R_f)}{E_p\left(\frac{1}{E_f R_f^2} + \frac{1}{E_s(R_s^2 - R_p^2)}\right)} \right]^{1/2}.$$

Aspect 50 of the description is:
The method of manufacturing an optical fiber of Aspect 49, wherein the pullout force is less than 1.05 lb$_f$/cm.

Aspect 51 of the description is:
The method of manufacturing an optical fiber of Aspect 49, wherein the pullout force is less than 0.90 lb$_f$/cm.

Aspect 52 of the description is:
The method of manufacturing an optical fiber of Aspect 49, wherein the pullout force is less than 0.65 lb$_f$/cm.

Aspect 53 of the description is:

The method of manufacturing an optical fiber of any of Aspects 48-52, wherein the thickness of the primary coating is in the range of greater than 15 µm to less than 30 µm.

Aspect 54 of the description is:

The method of manufacturing an optical fiber of any of Aspects 48-53, wherein the thickness of the secondary coating is in the range of greater than 7.0 µm to less than 25 µm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber, comprising:
an outer diameter of less than 220 µm;
a glass core defining a centerline through a center thereof;
a glass cladding surrounding and in direct contact with the glass core, the glass core and the glass cladding defining a glass fiber, an outer circumference of the glass fiber having a radius from the centerline given by $R_f$ in centimeters;
a primary coating surrounding and in direct contact with the glass cladding, an outer circumference of the primary coating having a radius from the centerline given by $R_p$ in centimeters, the primary coating having a thickness less than 30 µm and a Young's modulus less than 0.5 MPa;
a secondary coating surrounding and in direct contact with the primary coating, an outer diameter of the secondary coating having a radius from the centerline given by $R_s$ in centimeters, the secondary coating having a thickness less than 27.5 µm; and
a pullout force that is less than a critical pullout force ($P_{crit}$) that is given by the equation:

$$P_{crit} = 462 \cdot R_f \left[ \frac{(1+v_p)\ln(R_p/R_f)}{E_p \left( \frac{1}{E_f R_f^2} + \frac{1}{E_s(R_s^2 - R_p^2)} \right)} \right]^{1/2},$$

where $E_f$ is a Young's modulus of the glass fiber in dynes/cm², $E_p$ is the Young's modulus of the primary coating in dynes/cm², $E_s$ is a Young's modulus of the secondary coating in dynes/cm², and $v_p$ is a Poisson ratio of the primary coating.

2. The optical fiber of claim 1, wherein the Young's modulus of the primary coating is less than 0.3 MPa.

3. The optical fiber of claim 1, wherein the pullout force is less than 0.90 lb$_f$/cm.

4. The optical fiber of claim 1, wherein the pullout force increases by less than a factor of 1.6 upon aging the optical fiber for at least 60 days.

5. The optical fiber of claim 1, wherein a tear strength of the primary coating is greater than 30 J/m².

6. The optical fiber of claim 1, wherein a tensile toughness of the primary coating is greater than 500 kJ/m³.

7. The optical fiber of claim 1, wherein the outer diameter of the optical fiber is less than 200 µm.

8. The optical fiber of claim 1, wherein the thickness of the primary coating is less than 20 µm.

9. The optical fiber of claim 1, wherein the secondary coating has a thickness of less than 20 µm.

10. The optical fiber of claim 1, wherein the primary coating thickness and the secondary coating thickness are each less than 20 µm.

11. The optical fiber of claim 1, wherein a ratio of the thickness of the primary coating to the thickness of the secondary coating is between 0.7 and 1.25.

12. The optical fiber of claim 1, wherein the pullout force is less than 0.66 lb$_f$/cm and the outer diameter is less than 180 µm.

13. The optical fiber of claim 1, wherein a puncture resistance of the secondary coating has a normalized puncture load greater than 4.4×10⁻⁴ g/µm².

14. An optical fiber ribbon comprising a plurality of the optical fiber of claim 1.

15. The optical fiber of claim 1, wherein the primary coating comprises a polyol compound, the polyol compound having an unsaturation of less than 0.1 meq/g.

16. The optical fiber of claim 1, wherein the primary coating comprises a mercapto-functional silane compound.

* * * * *

UNITED STATES PATENT AND TRADEMARK OFFICE
CERTIFICATE OF CORRECTION

| | |
|---|---|
| PATENT NO. | : 10,775,557 B2 |
| APPLICATION NO. | : 16/673370 |
| DATED | : September 15, 2020 |
| INVENTOR(S) | : Ching-Kee Chien et al. |

Page 1 of 1

It is certified that error appears in the above-identified patent and that said Letters Patent is hereby corrected as shown below:

On the Title Page

In Column 2, item (57), Abstract, Line 10, delete "27.5 m" and insert -- 27.5 μm --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*